(12) United States Patent
Monnier et al.

(10) Patent No.: US 10,002,449 B2
(45) Date of Patent: Jun. 19, 2018

(54) RESPONSIVE AND ADAPTIVE CHART CONTROLS

(71) Applicant: SAP SE, Walldorf (DE)

(72) Inventors: Vincent Monnier, Fontenay Sous Bois (FR); Junjie Zhu, Shanghai (CN); Sylvie Denis, Mery sur Oise (FR)

(73) Assignee: SAP SE, Walldorf (DE)

( * ) Notice: Subject to any disclaimer, the term of this patent is extended or adjusted under 35 U.S.C. 154(b) by 0 days. days.

(21) Appl. No.: 14/688,654

(22) Filed: Apr. 16, 2015

(65) Prior Publication Data

US 2016/0307344 A1    Oct. 20, 2016

(51) Int. Cl.
| | |
|---|---|
| *G06T 11/40* | (2006.01) |
| *G06T 11/20* | (2006.01) |
| *G06F 3/14* | (2006.01) |
| *G06F 3/0485* | (2013.01) |
| *G06F 3/0488* | (2013.01) |
| *G06F 3/0484* | (2013.01) |

(52) U.S. Cl.
CPC .......... *G06T 11/206* (2013.01); *G06F 3/0485* (2013.01); *G06F 3/04845* (2013.01); *G06F 3/04847* (2013.01); *G06F 3/04883* (2013.01); *G06F 3/1415* (2013.01); *G06F 2203/04806* (2013.01); *G06T 2200/24* (2013.01); *G06T 2207/20072* (2013.01)

(58) Field of Classification Search
CPC .................................................. H04N 7/0122
USPC ....................................................... 345/440
See application file for complete search history.

(56) References Cited

U.S. PATENT DOCUMENTS

| | | | | |
|---|---|---|---|---|
| 6,124,841 | A * | 9/2000 | Aoyama | G06T 3/40 345/636 |
| 6,577,330 | B1 * | 6/2003 | Tsuda | G06F 3/04815 715/781 |
| 6,772,144 | B2 * | 8/2004 | Brid | G06F 17/30905 |
| 7,010,551 | B2 * | 3/2006 | Terayama | G06F 17/30905 |
| 2003/0009567 | A1 * | 1/2003 | Farouk | G06F 17/30905 709/229 |
| 2004/0141644 | A1 * | 7/2004 | Kurosawa | H04M 1/2755 382/182 |

(Continued)

*Primary Examiner* — Javid A Amini
(74) *Attorney, Agent, or Firm* — Jones Day

(57) ABSTRACT

A method, a system, and a computer readable storage medium for automatically adjusting a chart on a display device. The adjustment is implemented in a chart control, which is installed as a library used in chart applications. An application developer determines the extent to which the chart control is implemented for each chart. Application developers implement chart control libraries so that a user of an application having a chart that references the chart control library can experience at least the following features, irrelevant of chart size, screen size, and screen type: responsive tooltip, zoom in, zoom out, responsive zoom slider, action on selection and selection bar, thumbnail mode, responsive toolbar, responsive legend, responsive format, responsive display or an axis, and responsive display of horizontal bars. Additional features available through the chart control library are related to both user gesture changes and also chart layout changes, which both vary based on the chart size, the screen type of a user device, and screen size of the user device.

20 Claims, 18 Drawing Sheets

(56) References Cited

U.S. PATENT DOCUMENTS

| | | | | |
|---|---|---|---|---|
| 2007/0260981 A1* | 11/2007 | Kim | G06F 3/04812 | 715/256 |
| 2008/0046506 A1* | 2/2008 | Broda | G06F 9/4443 | 709/203 |
| 2009/0289958 A1* | 11/2009 | Kim | G06F 3/04886 | 345/649 |
| 2010/0020222 A1* | 1/2010 | Jones | G06F 3/04883 | 348/333.02 |
| 2010/0194754 A1* | 8/2010 | Alsbury | G06F 3/017 | 345/440 |
| 2011/0001763 A1* | 1/2011 | Murakami | G09G 5/14 | 345/661 |
| 2011/0289397 A1* | 11/2011 | Eastmond | G06F 3/0485 | 715/212 |
| 2012/0096345 A1* | 4/2012 | Ho | G06F 3/017 | 715/252 |
| 2012/0110431 A1* | 5/2012 | Rosenfeld | G06F 3/04883 | 715/230 |
| 2012/0232988 A1* | 9/2012 | Yang | G06Q 30/02 | 705/14.49 |
| 2012/0242571 A1* | 9/2012 | Takamura | G09G 5/36 | 345/156 |
| 2012/0256967 A1* | 10/2012 | Baldwin | G06F 3/013 | 345/684 |
| 2013/0016281 A1* | 1/2013 | Sato | H04N 1/00448 | 348/468 |
| 2013/0083064 A1* | 4/2013 | Geisner | G06F 17/30047 | 345/633 |
| 2014/0033056 A1* | 1/2014 | Kim | G06F 3/0484 | 715/738 |
| 2014/0059424 A1* | 2/2014 | Kim | G06F 17/212 | 715/235 |
| 2014/0085339 A1* | 3/2014 | Brady | G06T 3/60 | 345/649 |
| 2014/0095328 A1* | 4/2014 | Forouzandeh | G06Q 30/0277 | 705/14.73 |
| 2014/0201618 A1* | 7/2014 | Hansmann | G06F 17/3089 | 715/234 |
| 2014/0201682 A1* | 7/2014 | Lee | G06F 3/04817 | 715/846 |
| 2014/0208263 A1* | 7/2014 | Maklouf | G06T 3/0018 | 715/802 |
| 2014/0210827 A1* | 7/2014 | Alsbury | G06T 11/206 | 345/440.2 |
| 2014/0250374 A1* | 9/2014 | Ohki | G06F 17/21 | 715/247 |
| 2014/0278502 A1* | 9/2014 | Laskin | G06Q 50/22 | 705/2 |
| 2015/0061968 A1* | 3/2015 | Park | G06F 3/1423 | 345/2.1 |
| 2015/0186119 A1* | 7/2015 | Chouinard | G05B 19/0425 | 717/113 |
| 2015/0227514 A1* | 8/2015 | Gillett | G06F 17/30011 | 707/608 |
| 2015/0235147 A1* | 8/2015 | Godber | G06Q 30/06 | 705/5 |
| 2015/0347379 A1* | 12/2015 | Chaudhri | G06F 3/04842 | 715/773 |
| 2016/0092408 A1* | 3/2016 | Lagerblad | G06F 3/04842 | 715/243 |
| 2016/0132595 A1* | 5/2016 | Bliss | G06F 17/30864 | 707/706 |
| 2016/0196198 A1* | 7/2016 | Ajith Kumar | G06F 11/3495 | 714/45 |
| 2016/0232151 A1* | 8/2016 | Blackmon | G06F 17/248 | |

\* cited by examiner

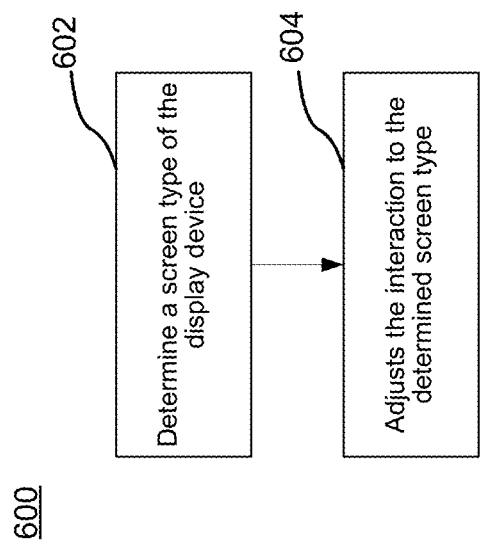

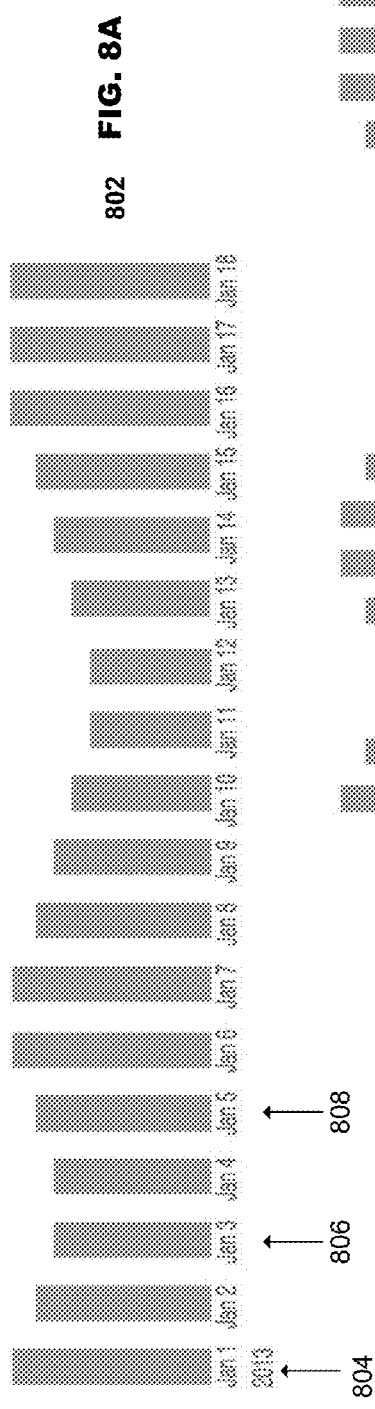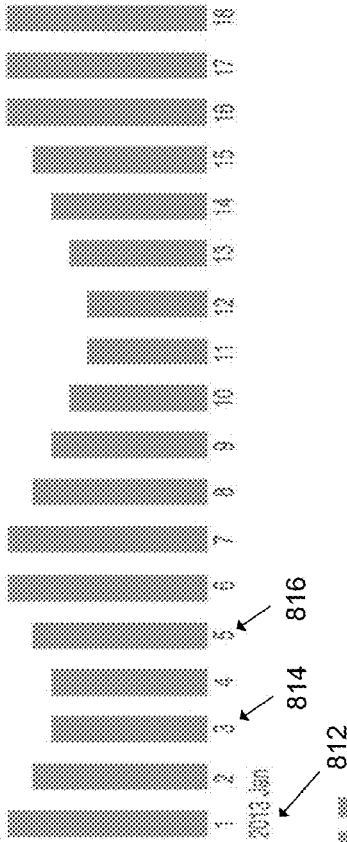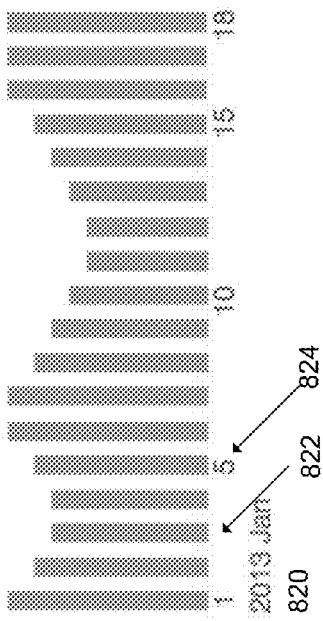

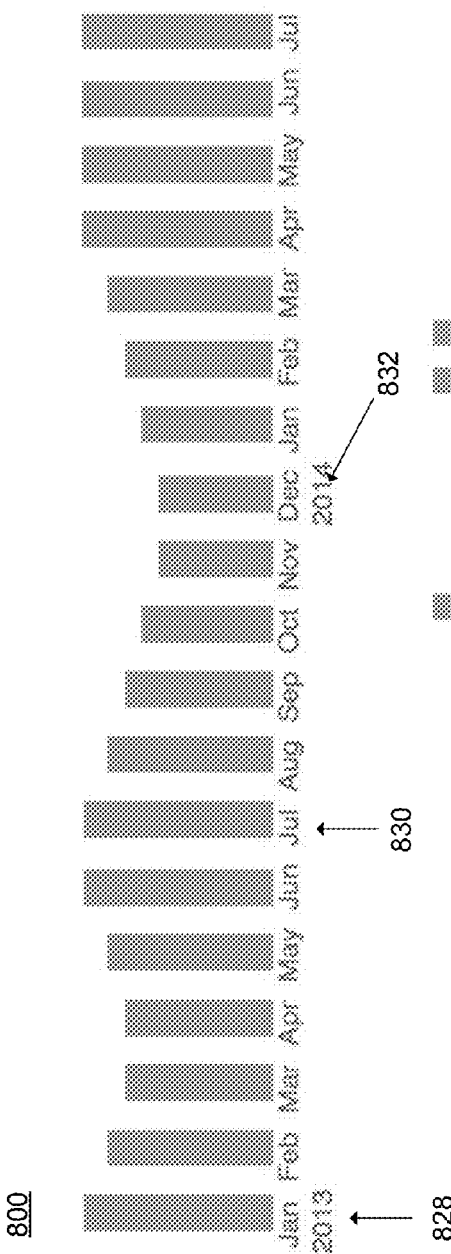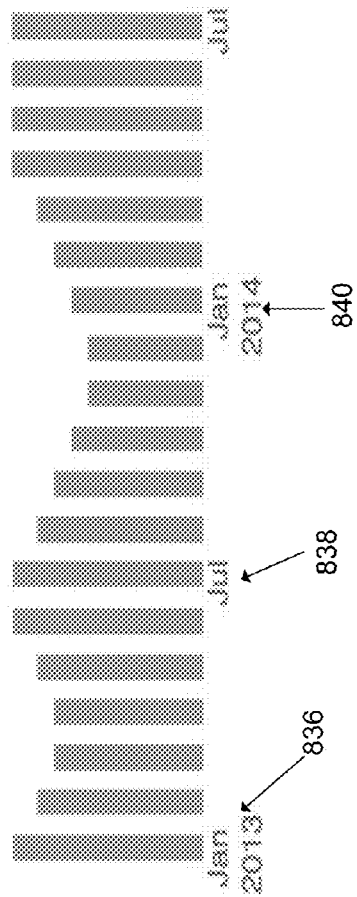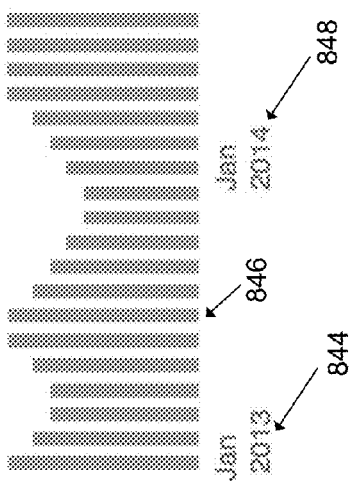

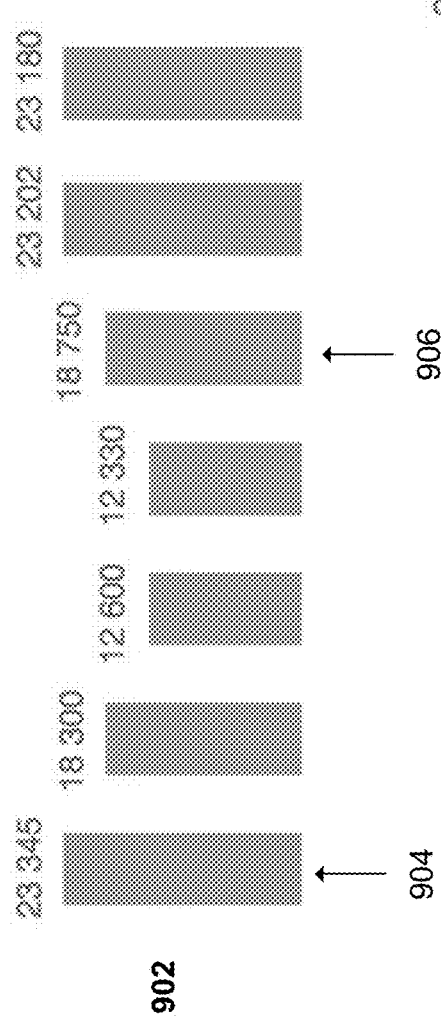
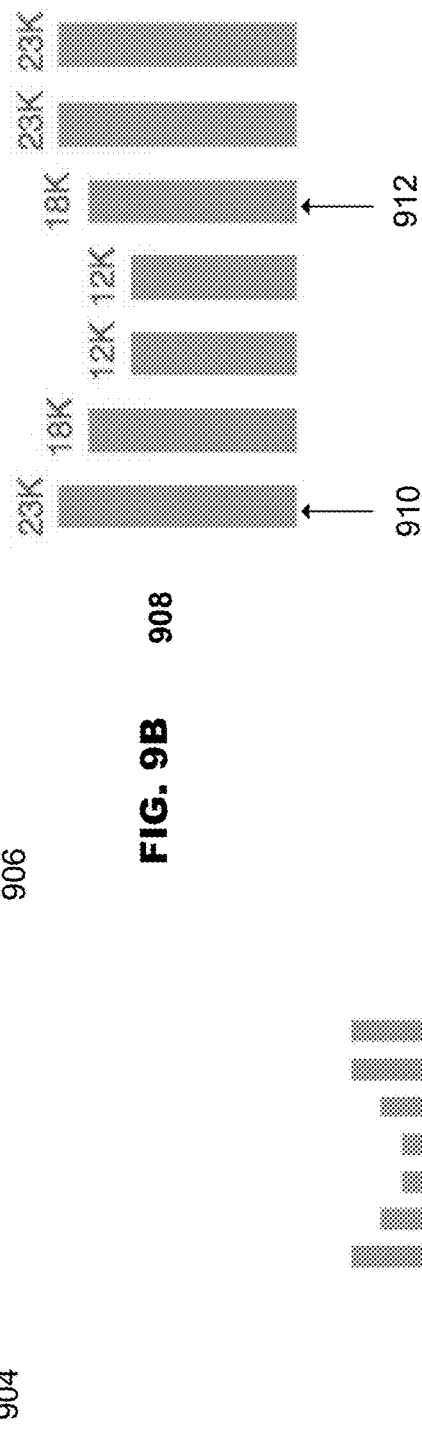
FIG. 9A
FIG. 9B
FIG. 9C

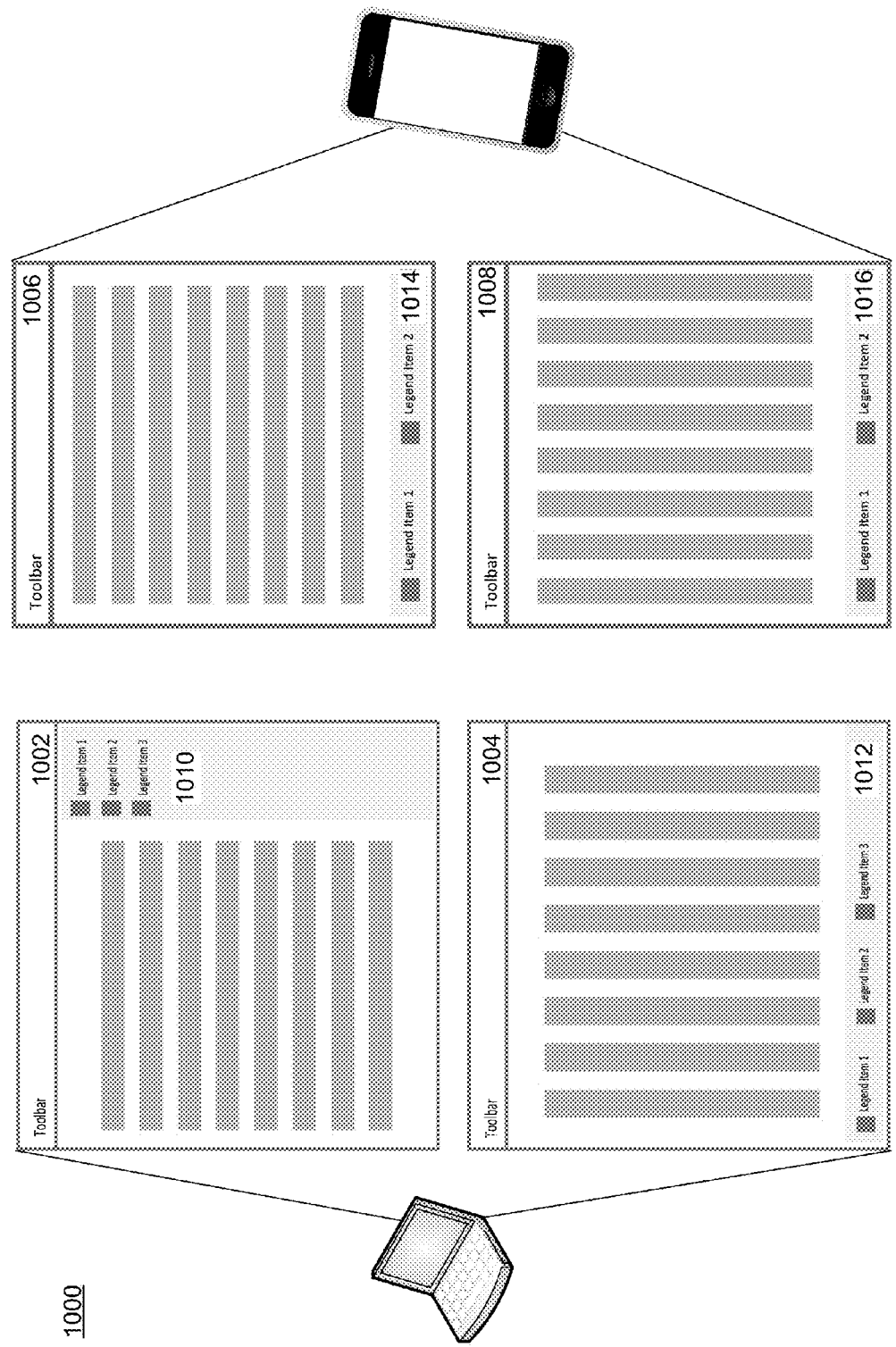

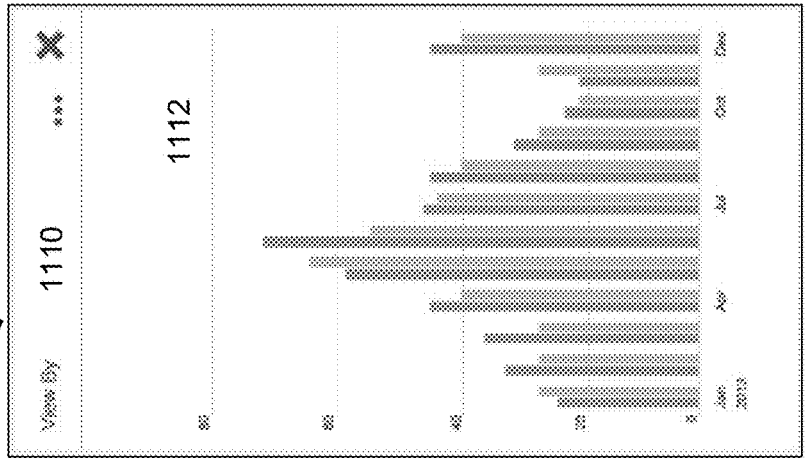
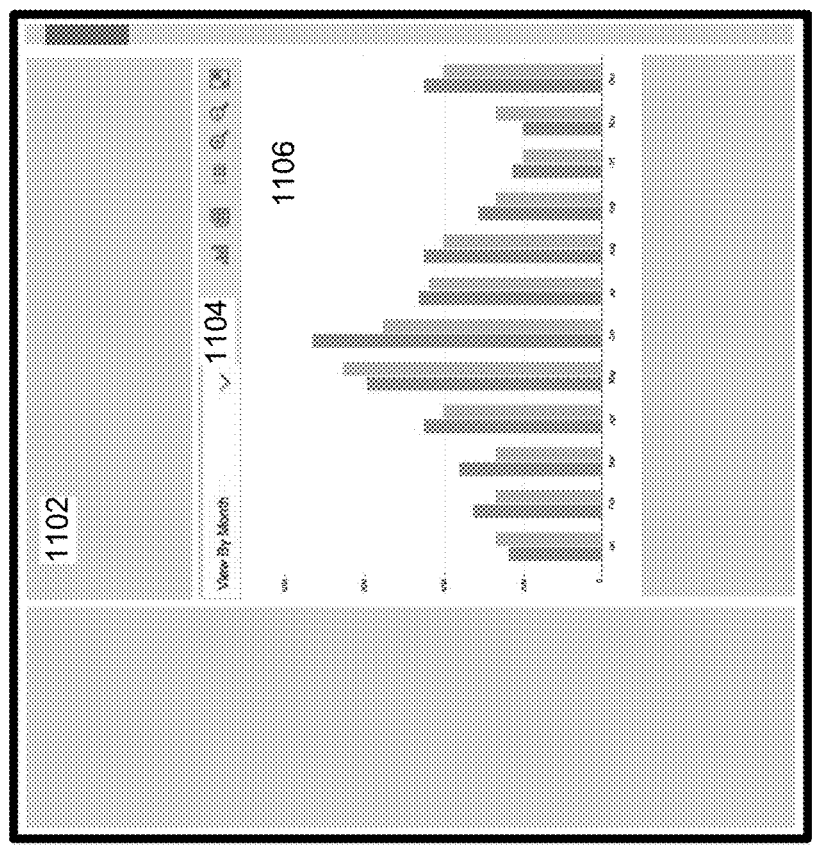

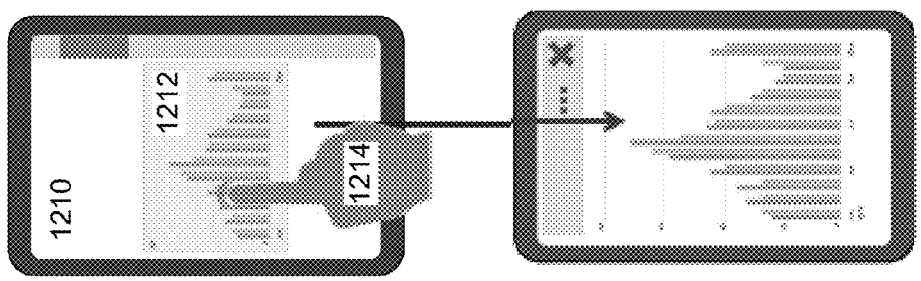
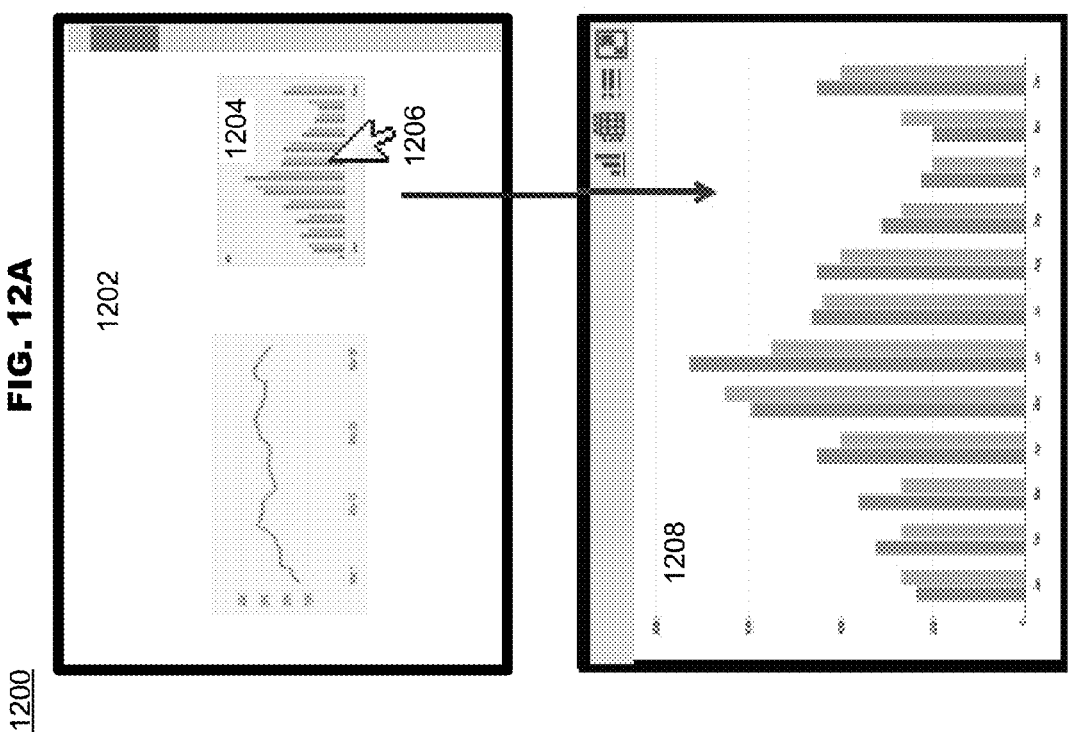

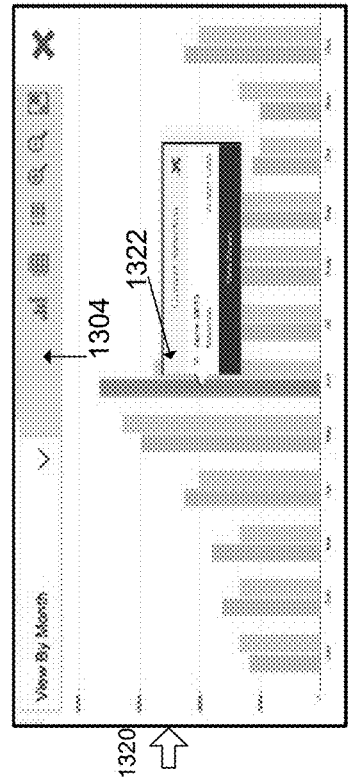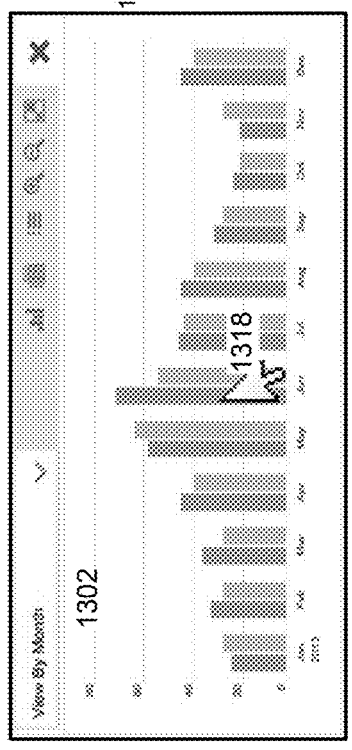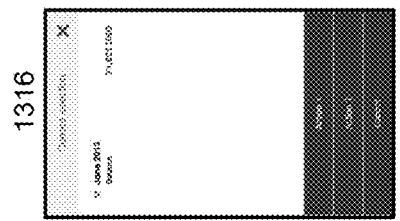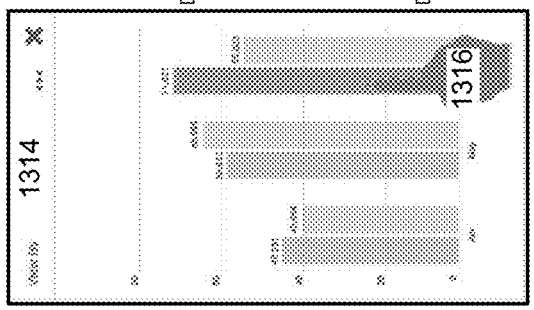
FIG. 13A
FIG. 13B
FIG. 13C

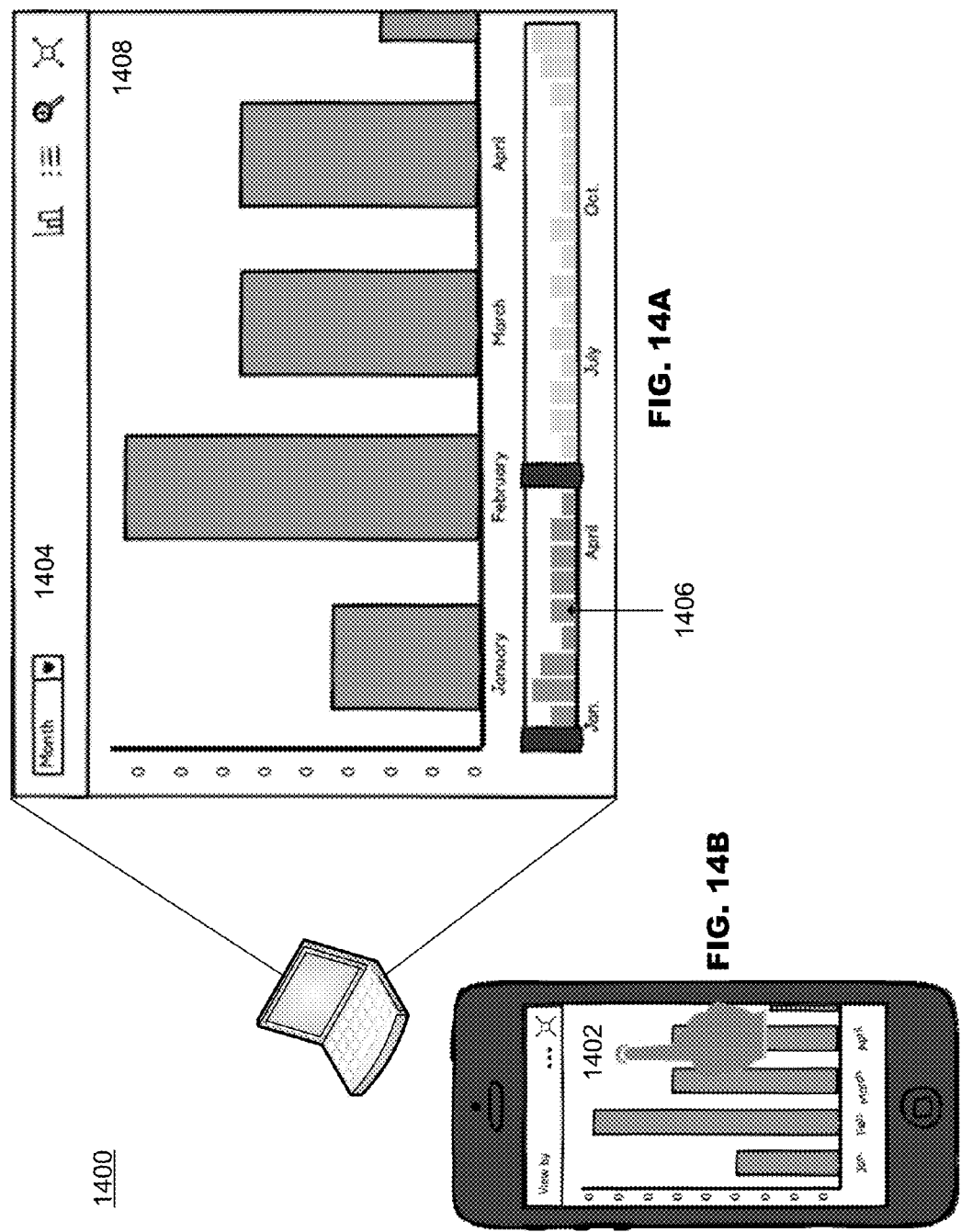

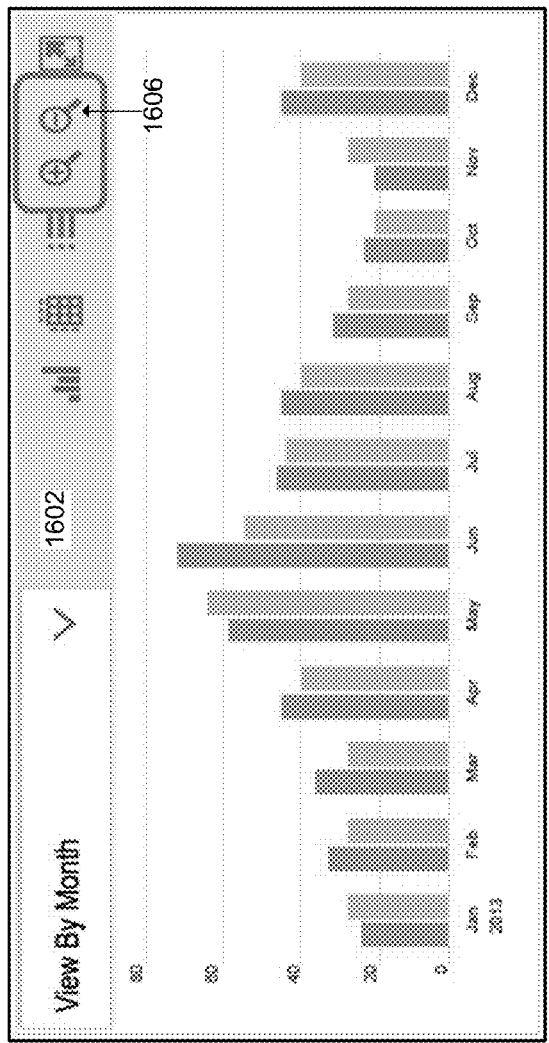
FIG. 16A
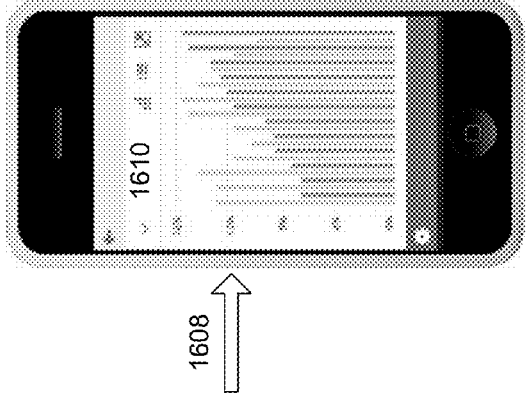
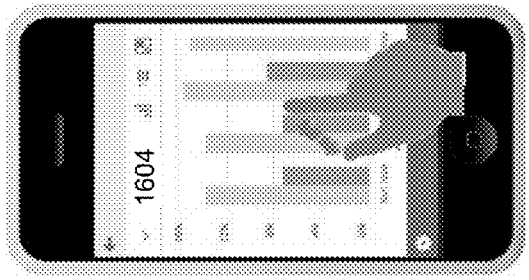
FIG. 16B

RESPONSIVE AND ADAPTIVE CHART CONTROLS

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyrights whatsoever.

FIELD

A method, device, system, and computer program product that relate to adaptation of a chart to different display apparatuses; and in addition, the invention relates to a Network server storing a library hosting at least one adaptation behavior that, when instantiated, determine how the chart should adapt to the apparatus currently displaying the chart.

BACKGROUND

Application Developers, when developing an application, use charts that present information in a visualized format. The charts are created by Chart Component Developers. The charts created by the Chart Component Developers are a graphical representation of data. A chart can be in any one of various forms, such as, for example: a bar chart, a column chart, a bullet chart, a line chart, a bubble chart, a stack chart, a pie chart, a map, a histogram, a waterfall chart, a timeline chart, an organizational chart, a tree chart, a flow chart, an area chart, a cartogram, and a pedigree chart. The data presented in a chart is harvested from on-line or off-line sources. On-line and off-line sources refer to whether the chart is accessing data over a communication network, such as the Internet, or accessing locally saved data.

While building an application that includes a chart, Application Developers select, from a gallery, or another library resource, different charts created by the Chart Component Developers that are "ready-to-use" or able to be programmed with minimal further activity by the Application Developer. In so doing, an Application Developer embeds additional programming language, such as HTML or JavaScript, within the website application design. The Application Developer then, to provide support for the chart selected from the gallery, which is defined by the embedded programming language, includes in the code a reference to at least one library and to the data that is to be charted. Application Developers in some instances can further select options to customize the selected chart.

After incorporation of the chart libraries and data, charts are rendered using technology such that the charts are visible to different users having access to the chart via different browsers. Some of these rendering techniques support HTML5/SVG, and VML. Charts, upon display to a consumer, are either non-interactive or interactive. An interactive chart suggests that a user, by manipulating a user device, can alter the way that data is presented or visualized.

Charts, as traditionally designed for applications, have several drawbacks. Charts are typically interactive, and therefore fully portable, only on personal computers. Therefore, a user accessing an application on an iPhone device (or another smartphone device), would not necessarily have the same fully interactive experience as another user on the personal computer. The platforms for display, which are all of different sizes, provide variable size screens for the user interfaces to which the chart design cannot adapt and on which text is displayed in an inconsistent and/or illegible manner. In order to account for the portability failures of charts, on the platforms that are not personal computers, the Application Developers often remove charts and replace them with tables, which are more portable. However, tables do not always provide data in an efficient manner for analysis by a consumer, and therefore are not generally desirable.

In order to keep charts in an Application for non-personal computing platforms, the Application Developer must take one of the following actions: reduce the amount of data and make up for the data reduction by aggregation (i.e., a series of different precisely and exhaustively coded charts); reduce or remove actions or interactive functions from the chart (i.e., a non-interactive chart); customize the chart for an appropriate responsiveness level; and/or use a chart that is strictly dedicated to mobile platforms. In order to create platform specific applications, Application Developers must create multiple versions of an Application, with one for use on each platform or on each type of platform (e.g., smartphone, tablet, personal computer).

Accordingly, a there is a need for charts that are portable across different display devices, which are fully interactive, and that retain the original interactive results that would otherwise be available on personal computers.

BRIEF DESCRIPTION OF THE DRAWINGS

FIG. 6 is an illustration of a system 600 for implementing the automatic adaptation of the chart on a display device.

FIG. 8A is an illustration of a feature 800, responsive display of time axis, for automatically adapting layout to the size of the chart.

FIG. 8B is an illustration of a feature 800, having another embodiment of the responsive display of time axis feature, for automatically adapting layout to the size of the chart.

FIG. 8C is an illustration of a feature 800, having another embodiment of the responsive display of time axis feature, for automatically adapting layout to the size of the chart.

FIG. 8D is an illustration of a feature 800, having another embodiment of the responsive display of time axis feature, for automatically adapting layout to the size of the chart.

FIG. 8E is an illustration of a feature 800, having another embodiment of the responsive display of time axis feature, for automatically adapting layout to the size of the chart.

FIG. 8F is an illustration of a feature 800, having another embodiment of the responsive display of time axis feature, for automatically adapting layout to the size of the chart.

FIG. 9A is an illustration of a feature 900, responsive format, for automatically adapting layout to the size of the chart.

FIG. 9B is an illustration of a feature 900, having another embodiment of the responsive format feature, for automatically adapting layout to the size of the chart.

FIG. 9C is an illustration of a feature 900, having another embodiment of the responsive format feature, for automatically adapting layout to the size of the chart.

FIG. 10A is an illustration of a feature 1000, responsive legend, for automatically adapting layout to the size of the chart.

FIG. 10B is an illustration of a feature 1000, having another embodiment of the responsive legend feature, for automatically adapting layout to the size of the chart.

FIG. 11A is an illustration of a feature 1100, responsive toolbar, for automatically adapting layout to the size of the chart.

FIG. 11B is an illustration of a feature 1100, having another embodiment of the responsive toolbar feature, for automatically adapting layout to the size of the chart.

FIG. 12A is an illustration of a feature 1200, thumbnail mode, for automatically adapting interaction to the screen size of the display device.

FIG. 12B is an illustration of a feature 1200, having another embodiment of the thumbnail mode feature, for automatically adapting interaction to the screen size of the display device.

FIG. 13A is an illustration of a feature 1300, actions on selection, for automatically adapting interaction to the screen size of the display device.

FIG. 13B is an illustration of a feature 1300, having another embodiment of the actions on selection feature, for automatically adapting interaction to the screen size of the display device.

FIG. 13C is an illustration of a feature 1300, having another embodiment of the actions on selection feature, for automatically adapting interaction to the screen size of the display device.

FIG. 14A is an illustration of a feature 1400, zoom slider, for automatically adapting interaction to the screen size of the display device.

FIG. 14B is an illustration of a feature 1400, having another embodiment of the zoom slider feature, for automatically adapting interaction to the screen size of the display device.

FIG. 16A is an illustration of feature 1600, zoom in, for automatically adapting interaction to the screen type of the display device.

FIG. 16B is an illustration of feature 1600, having another embodiment of the zoom in feature, for automatically adapting interaction to the screen type of the display device.

DETAILED DESCRIPTION

Example embodiments of the present invention provide for a method, device, system, and computer program product for adapting a display to the context of the device used to display the chart; for adapting an interaction to the context of the device used to display the chart; and for providing a chart dedicated to the smaller display screen devices, such as mobile devices.

In adapting interactions and layouts of charts, Chart Developers consider a particular set of features that are relevant in determining the best manner of adapting a chart. The Chart Developers must determine whether a chart should be embedded in a screen, presented as a full screen, or take up part of the frame yet remain interactive. Chart Developers further consider the desired chart type. As described above the chart type can be at least any one of: a bar chart, a column chart, a bullet chart, a line chart, a bubble chart, a stack chart, a pie chart, a map, a histogram, a timeline chart, an organizational chart, a tree chart, a flow chart, an area chart, a cartogram, and a pedigree chart. Further consideration is provided to the directionality of the chart—namely whether the chart should have a horizontal or vertical directionality. The apparatus by which the display device experiences interaction from the user, is also a necessary consideration in determining how a user interaction with the display device is to be modified. As an example, users interact with some charts via a mouse device (e.g., optical device, external, wheel, multiple inputs). The Chart Developer further considers the number of data points, as well as the number of actions and information that must be made available to the user. Of additional interest to the chart developer is whether or not the chart must be backwards compatible, and whether there is one chart or multiple charts per application.

A method is implemented in order to automatically adjust a chart such that the chart fits, and is interactive, on any display device. The chart features are adapted according to at least one adaptation factor, the adaptation factor being a: chart size, a display screen size, and a display screen type. The method for automatically adjusting a chart on a display device involves, at least determining if a chart is implemented in an application on the display device, and if the chart is implemented in the application on the display device: determining at least one adaptation factor, and automatically adapting at least one of the layout of the chart and the interaction of the chart, based on the at least one adaptation factor.

Figure 1:
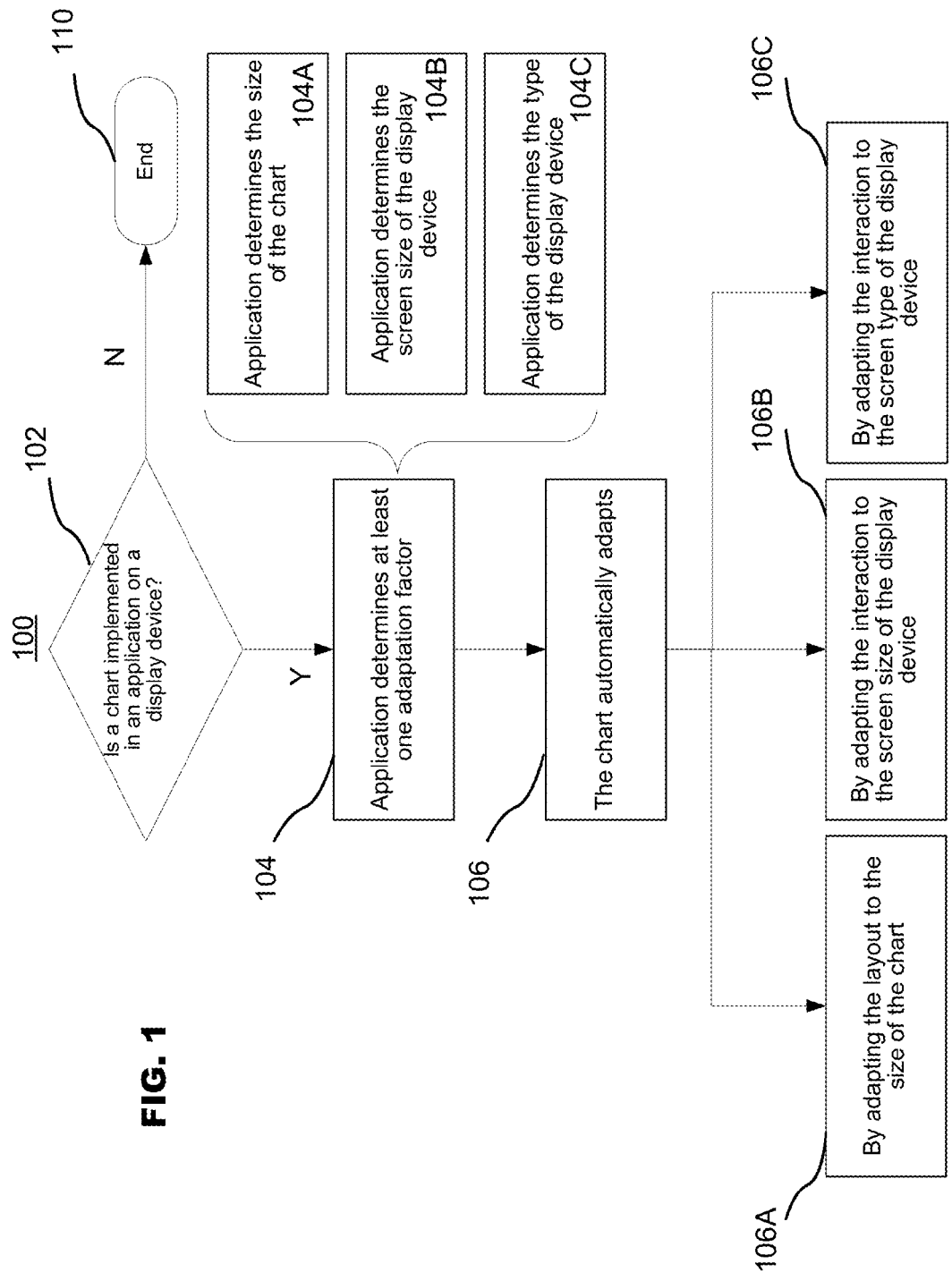
FIG. 1 is an illustration of a flowchart 100 for automatically adapting a chart on a display device.

FIG. 1 is an illustration of a flowchart 100 for automatically adapting a chart on a display device. According to 102, it is determined whether a chart is being implemented in an application on the display device. If a chart is being implemented in an application on the display device, the method proceeds according to 104. In 104, the application determines at least one adaptation factor. The adaptation factor can be any one of: the size of the chart (104A), the screen size of the display device (104B), and the type of the display device (104C). Based on at least one of the described adaptation factors (104A, 104B, and 104C), in 106, the chart automatically adapts. A chart is adapted in at least one of three ways. In a first way, and as shown in step 106A, the chart is automatically adapted such that the layout is properly adjusted to the chart size. In a second way, and as shown in 106B, the chart is automatically adapted such that the manner of interaction of the user with the chart is preserved on the screen size of the display device. In a third way, and as shown in 106C, the chart is automatically adapted such that the manner of interaction of the user with the chart is preserved for the screen type of the display device. If a chart is not being implemented in an application on the display device, the method ceases according to step 108.

Automatically Adapting the Chart

Figure 2:
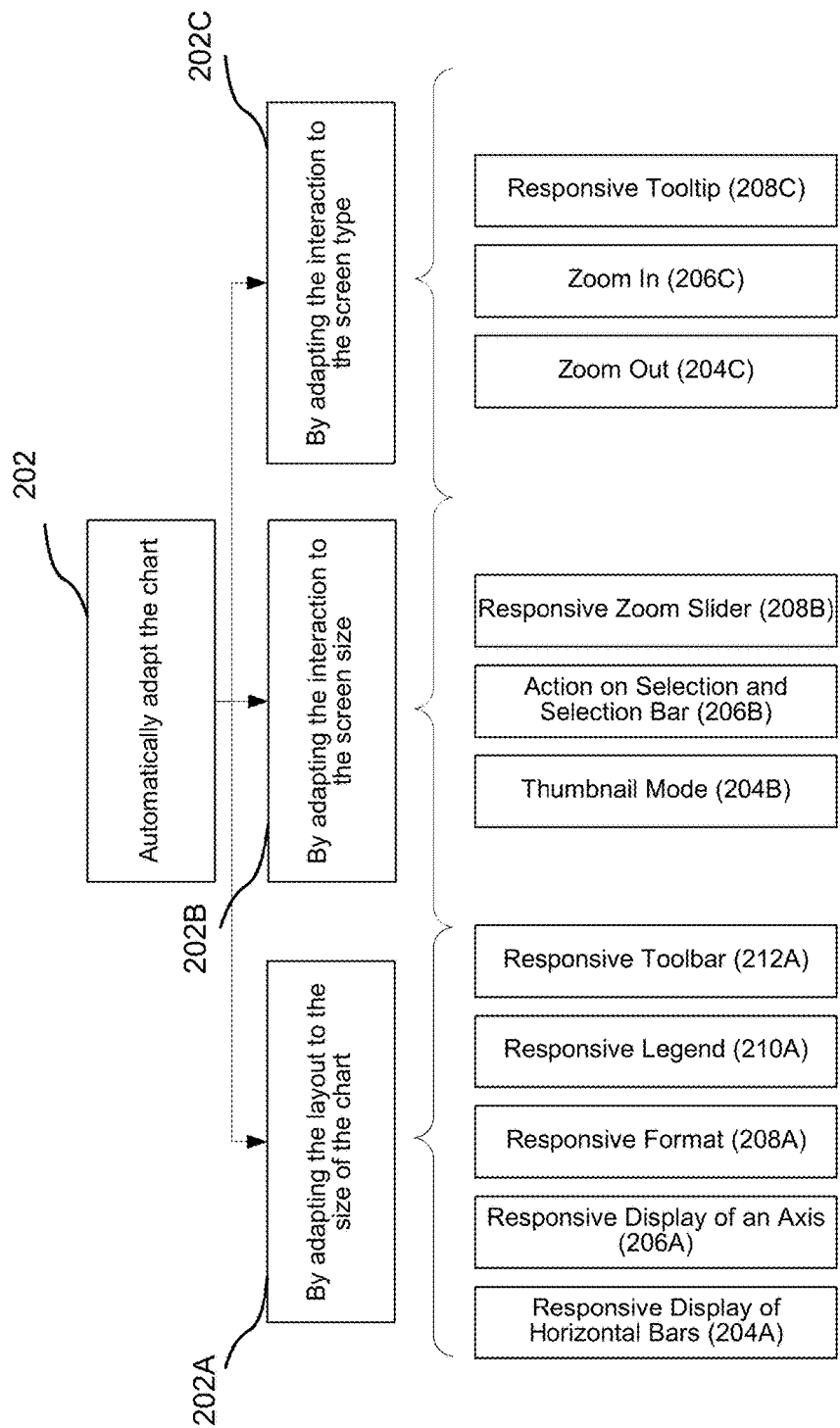
FIG. 2 is an illustration of a flowchart 200 for the sorts of actions that are implemented in order to (i) adapt layout to a size of the chart, (ii) adapt interaction to the screen size, and (iii) adapt interaction to the screen type.

FIG. 2 is an illustration of a flowchart 200 for the sorts of actions that are implemented in order to achieve (i) Responsive Layout and (ii) Responsive Interaction. A Responsive Interaction is further provided by one of (a) adapting the interaction to the screen size of the display device and (b) adapting the interaction to the screen type of the display device. As described in FIG. 1, adaptation of a chart is performed in at least one of three ways. As shown in step 202, it is determined that a chart must automatically be adapted. In a first way, and as shown in step 202A, the chart is automatically adapted such that the layout of the chart, such as the chart content, is properly adapted to the chart size. In a second way, and as shown in step 202B, the chart is automatically adapted to the screen size such that the manner of interaction of the user with the chart is preserved. As shown in step 202C, the chart is automatically adapted to the screen type such that the manner of interaction of the user with the chart is preserved.

In accordance with 202A, the layout of the chart is automatically adapted to the chart size in at least one of the following ways: a responsive display of horizontal bars (204A); a responsive display of an axis (206A); a responsive format (208A); a responsive legend (210A); and a responsive toolbar (212A). In accordance with 202B, the interaction of the chart is automatically adapted to the screen size in at least one of the following ways: a thumbnail mode (204B); an action, single or multiple, on selection and the selection bar (206B); and responsive zoom slider (208B). In accordance with 202C, the interaction of the chart is automatically adapted to the screen type in at least one of the following ways: a zoom out (204C); a zoom in (206C); and a responsive tooltip (208C). Each of 204A, 206A, 208A, 210A, 212A, 204B, 206B, 208B, 204C, 206C, and 208C, is described in greater detail in the following paragraphs and with reference to additional Figures.

Figure 3:
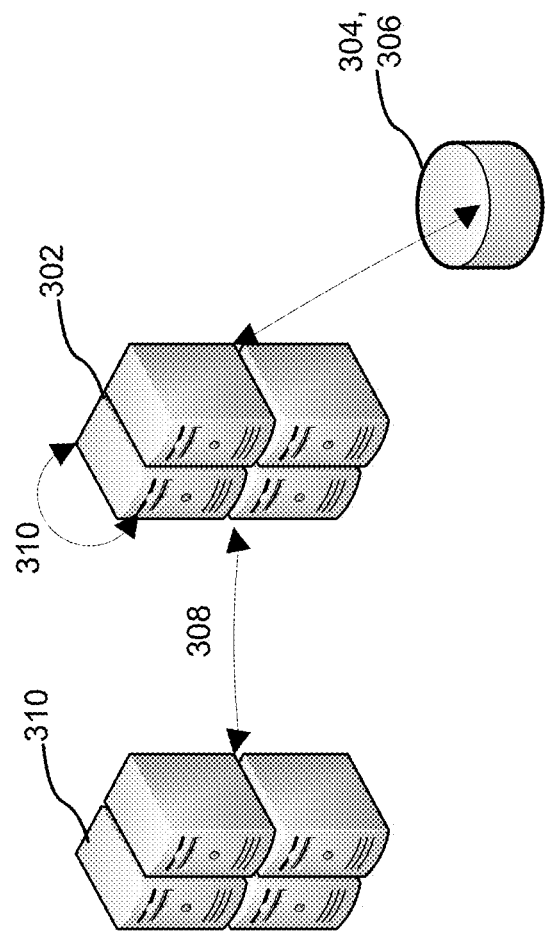
FIG. 3 is an illustration of a flowchart 300 for automatically adapting chart layout to a size of the chart.

FIG. 3 is an illustration of a system 300 for implementing the automatic adaptation of the chart to a display device. A system 300 automatically adjusts a chart to a display device. The system 300 includes at least one server 302, having a database 304. Hosted on the database is at least one library 306. In an example embodiment, the server 302 receives, over a network connection 308, a request from an application hosted on another server 310 to access the library 306. In another example embodiment, the server 302 receives, over a local connection 310, a request from an application hosted on the same server 302 to access the library 306. The library includes executable files that can automatically adapt the chart on one of the remote server 310 and the same server 302 to a display device 312. The library adapts the chart by: determining if the chart is implemented in the application on the display device; if the chart is implemented in the application of the display device: determining at least one adaptation factor; and automatically adapting the chart to the accordingly to the at least one adaptation factor. The automatic adaptation of the chart proceeds according to any of the methods described herein.

In an example embodiment, the application hosting a chart for adaptation to a display device is developed in a web integrated development environment (IDE), such as SAP Web IDE or Eclipse. The SAP Web IDE includes the capabilities of SMP AppBuilder, SAP AppDesigner, Gateway PA Tools and Fiori toolkit. The application is developed using a browser or a modern language, such as HTML, CSS, or JavaScript. The Application Developers have access to, through the server or networked server library files, the SAP UI5 library. As part of the UI5 library, Chart Developers have generated specific library files for automatic chart adaptation, such as SAP's vizFrame. In order utilize the specific library files for automatic chart adaptation, the Application Developer must install the library files onto their development specific server (e.g., FIG. 3, server 310 or server 302). Once the application is developed and deployed by the Application Developer, the application is hosted on a network for access by various consumers.

For consumption, the application is rendered by a web browser (such as Safari, Internet Explorer, Google Chrome, etc.), that executes the application files and the libraries referenced in the application. In order to properly execute the application files and the libraries, the library files must be installed on the server that produces, or executes, the application files and the libraries for the consumer. The application is presented on a graphical user interface, such as SAP GUI. Consumers can utilize applications including the above-described system for implementing the automatic adaptation of the chart via at least one of: a NW ABAP Server; a NW JavaServer; HANA XS Engine; and HCP.

Adapting Layout to the Chart Size

In order to adapt the layout to the chart size, the method provides for properly adjusting the content to the chart size. The method, accordingly, as part of the automatically adapting the chart: determines a size of the chart; and adjusts the content of the chart to the determined chart size. The size of the chart is set by the application developer.

Figure 4:
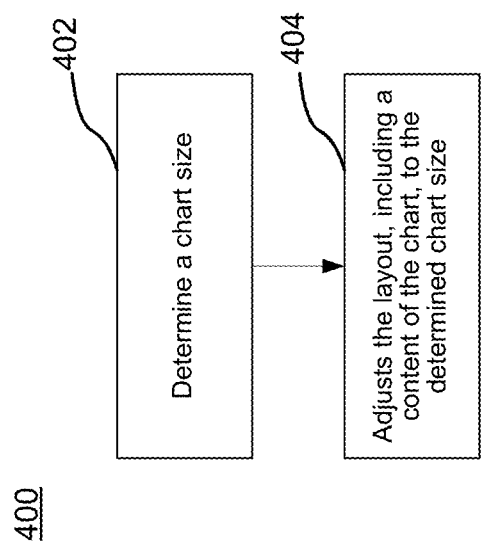
FIG. 4 is an illustration of a flowchart 400 for automatically adapting chart interaction to a screen size.

FIG. 4 is an illustration of a flowchart 400 for automatically adapting a layout to a chart size. According to 402, the method determines the chart size. In an example embodiment, a chart size is determined in terms of a scaled arrangement (e.g., length=2× and width=3×) as opposed to fixed dimensions. In another example embodiment, a chart size is determined according to numerically fixed dimensions. Following 402, in 404, the method adjusts the layout, including the content of the chart, to the determined chart size. In an example embodiment, adjusting the content includes changing features of the chart by altering their length, width, and/or height. Content features to be adjusted may also refer to the specific informational elements of a chart, such as: bars in bar charts, pie slices in a pie chart, text associated with a chart, etc. Adjusting features, in an example embodiment, accounts for maintaining legibility despite a high or low pixel density of the display device. In some embodiments, adjusting features includes hiding some features in order to maintain the legibility or size of other features.

It should be understood that adjusting the content of the chart encompasses: changing dimensions; scaling; enlarging; extending; magnifying; multiplying; spreading; constricting; hiding; lessening; reducing; compressing; shrinking; adjusting to a ratio; and other similar adjustments. An adjusting operation can further involve: only a downward scaling operation (e.g., scaling 4× by 5× to 2× by 2.5×), only an upward scaling operation (e.g., scaling 4× by 5× to 8× by 10×), and a mixed downward scaling and upward scaling operation (e.g., scaling 4× by 5× to 2× by 10×).

Adapting Interaction to Screen Size

In order to adapt the interaction of the chart to the screen size, the method provides for adjusting interactive gestures such that they are capable of implementation on the screen size of the display device. The method, accordingly, as part of the automatically adapting the chart: determines a screen size of the display device; and adapts, based on the screen size of the display device, the available gestures to those that can be performed on the screen size of the display device. In an example embodiment, the screen size of the display device is made available to the chart from data available through the browser. To access the information related to the screen size through the browser, a media query is performed. The interaction available for the chart is implemented according to the screen size of the display device.

Figure 5:
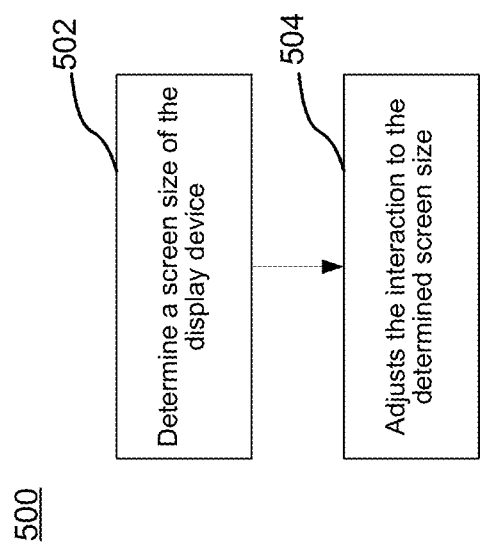
FIG. 5 is an illustration of a flowchart 500 for automatically adapting chart interaction to a screen type.

FIG. 5 is an illustration of a flowchart 500 for automatically adapting an interaction of a chart to a screen size of a display device. According to 502, the method determines the screen size of the display device. Following 502, 504 determines which set of interactive gestures can be performed on the determined screen size of the display device according to space and apparatus constraints of the display device. In some embodiments, the determined set of interactive gestures is, in 506, implemented for all charts in the application. In other embodiments, the determined set of interactive gestures is, in 508, implemented only for the specific chart being viewed on the display device.

Adapting Interaction to Screen Type

In order to adapt the interaction of the chart to the screen type, the method provides for adjusting interactive gestures such that they are capable of implementation on the screen type of the display device. The method, accordingly, as part of the automatically adapting the chart: determines a screen type of the display device; and adapts, based on the screen type of the display device, the available gestures to those that can be performed by using the screen type of the display device. In an example embodiment, the screen type of the display device is made available to the chart from data available through the browser. To access the information related to the screen type through the browser, a media query is performed. The interaction available for the chart is implemented according to the screen type of the display device.

FIG. 6 is an illustration of a flowchart 600 for automatically adapting an interaction of a chart to a screen type of a display device. According to 602, the method determines the screen type of the display device. Following 602, 604 determines which set of interactive gestures can be performed on the determined screen type of the display device according to interactivity constraints (i.e., keyboard, optical mouse, touchscreen) of the display device. In some embodiments, the determined set of interactive gestures is, in 606, implemented for all charts in the application. In other embodiments, the determined set of interactive gestures is, in 608, implemented only for the specific chart being viewed on the display device.

Implementations of Automatically Adapting the Chart

The above described adaptations of the chart can be performed in numerous different ways. Specifically, it is clear that adaptations are made using one of, or by combining, adaptation: the layout to the size of the chart; the interaction to the screen size; and the interaction to the screen type. The following examples of responsive layout and responsive interaction do not define the extent of the scope of the method. Instead, the examples are embodiments presented in order to provide applications of the method and are non-limiting. The foregoing description should be considered sufficient to inform one of ordinary skill in the art how to practice and apply the method, and all obvious variants thereof, including the following example embodiments. As stated above with reference to FIG. 2, the following embodiments that are described with greater detail of the adaptations of the chart include: a responsive display of horizontal bars (204A); a responsive display of an axis (206A); a responsive format (208A); a responsive legend (210A); a responsive toolbar (212A); a thumbnail mode (204B); an action, single or multiple, on selection and the selection bar (206B); a responsive zoom slider (208B); a zoom out (204C); a zoom in (206C); and a responsive tooltip (208C).

Responsive Display of Horizontal Bars

Once the size of the chart is determined, the layout is adapted to the determined size of the chart. The size of the chart can vary, and the size of the chart is independent from the size of the display device. For example, a chart can be of the same size on a small display screen and on a large display screen. Small charts can be displayed on small display devices, such as smart phones, and small charts can further be displayed on large display devices, such as a desktop computer, as part of a dashboard. The determined chart size is used to set the layout of the chart. The features of the chart, or the content of the chart, adapts to the determined chart size.

Charts include axis labels associated with the horizontal bars. The labels are adjacent to the horizontal bars to provide information regarding the content of the chart. If a chart is a large chart size, then all features of the chart can be fully displayed. A horizontal bar can, on a large chart size, be labeled by a longer label such as "Accountant Number 123456789." If a chart is a small chart size, then it is unlikely that all features of the chart can be fully displayed. In such a circumstance, a longer label such as "Accountant Number 123456789" can no longer be fully displayed next to the horizontal bar.

In order to properly display features of the chart on chart having a small chart size, the content of the chart is adapted to the small chart size. In order to maintain legible font and graphic sizes, as well as to avoid truncation of labels, the location of the labels is altered as compared to the large chart size equivalent. For the small chart size, instead of placing the text associated with the horizontal bars adjacent to the horizontal bars, the text is relocated. In an example embodiment, the text is relocated as a default to sit on top of, or below, the corresponding horizontal bar. In some embodiments, however, the application developer can override the default setting and instead force that the text remains adjacent to the horizontal bars.

Horizontal bars include bar charts. However, the definition of horizontal bars should not be limited to bar charts and should be interpreted to subsume reasonable equivalents, including (but not limited to) charts such as: stacked bar charts, bullet charts, bar charts with hierarchies, and waterfall charts. The labels are, in an example embodiment, text. In another example embodiment, the labels are numerical values associated with the horizontal bars. In another example embodiment, the labels are images.

In order to implement responsive display of horizontal bars functionality according to the above-described method, it is first determined whether or not a chart is implemented in an application on the display device. If a chart is implemented in the application on the display device, then: the size of the chart is determined; and the content of the chart is adjusted to the determined chart size.

In some embodiments, the chart size could be coextensive with a 19 inch monitor, for example: 30 cm by 38 cm (e.g., height versus width, having a 4:5 ratio). Instead, the chart size could be coextensive with a 3.5 inch device, for example: 6 cm by 7 cm (e.g., height versus width, having a 4:5 ratio). The chart size, however, could be any size that is equal to or less than the size of the display screen. The chart size is set by the application developer. After the chart size is determined, the features of the chart, including the text associated with the horizontal bars, are adapted to fit to the determined chart size on the display device. In an example embodiment, not adapting the layout of the chart would result in illegible text, and therefore, the text associated with the horizontal bars is relocated to a different section of the chart for a better display to the user.

Figure 7A:
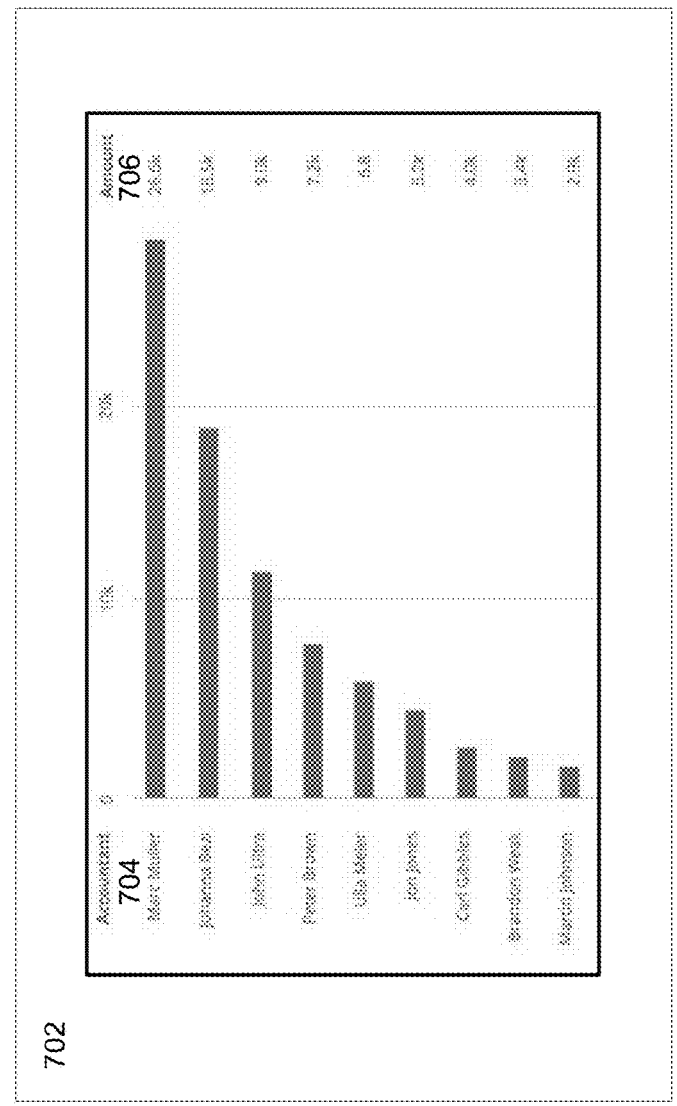
FIG. 7A is an illustration of a feature 700, responsive display of horizontal bars, for automatically adapting layout to the size of the chart.
Figure 7B:
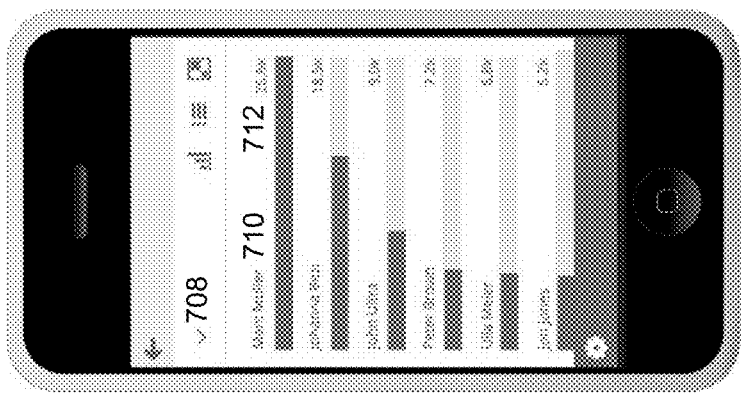
FIG. 7B is an illustration of a feature 700, having another embodiment of the responsive display of horizontal bars feature, for automatically adapting layout to the size of the chart.

FIG. 7, including FIGS. 7A and 7B, illustrates embodiments of a feature 700, responsive display of horizontal bars, for automatically adapting layout to the size of the chart.

FIG. 7A is an illustration of a feature 700, responsive display of horizontal bars, for automatically adapting layout to the size of the chart. Element 702 displays a chart having a large chart size. Element 702 includes a bar chart having labels: 704 (for an Accountant name) and 706 (for an Amount associated with the Accountant name).

FIG. 7B is an illustration of a feature 700, having another embodiment of the responsive display of horizontal bars feature, for automatically adapting layout to the size of the chart. Element 708 displays a chart having a small chart size. Element 708 is hosted on, in this particular instance, a smartphone, but element 708 could similarly be presented on a large display device such as a desktop computer. Element 708 includes a bar chart having labels: 710 (for an Accountant name) and 712 (for an Amount associated with the Accountant name).

In the horizontal bars associated with the large chart size, the labels, 704 and 706, are located adjacent to the appropriate horizontal bar. However, in the horizontal bars associated with the small chart size, the labels, 710 and 712, are located on top of the appropriate horizontal bar. Although the same information is presented, the reorganization of the text has made it such that the adjustment, as part of the adapting, is not simply a complete downscaling of all features in the chart. Instead, the chart is downscaled in the limiting direction, and the labels for the horizontal bars are relocated to provide greater legibility.

Responsive Display of Axis

Once the size of the chart is determined, the layout is adapted to the determined size of the chart. The size of the chart can vary, and the size of the chart is independent from the size of the display device. For example, a chart can be of the same size on a small display screen and on a large display screen. Small charts can be displayed on small display devices, such as smart phones, and small charts can further be displayed on large display devices, such as a desktop computer, as part of a dashboard. The determined chart size is used to set the layout of the chart. The features of the chart, or the content of the chart, adapts to the determined chart size.

Charts include axis labels associated with vertical bars. The labels are adjacent to the vertical bars to provide information regarding the content of the chart. If a chart is a large chart size, then all features of the chart can be fully displayed. A vertical bar can, on a large chart size, be labeled by a longer label such as "Quarter One." If a chart is a small chart size, then it is unlikely that all features of the chart can be fully displayed. In such a circumstance, a longer label such as "Quarter One" can no longer be fully displayed below the vertical bar.

In order to properly display features of the chart on chart having a small chart size, the content of the chart is adapted to the small chart size. In order to maintain legible font and graphic sizes, as well as to avoid truncation of labels, the location of the labels is altered as compared to the large chart size equivalent. Adapting the content of the labels for the small chart size further avoids overlapping labels along the axis beneath the vertical bars. For the small chart size, instead of placing the text associated with the vertical bars below or adjacent to the vertical bars, the text is one of intentionally truncated, hidden, relocated, or wrapped. Intentionally truncating the labels includes switching a label to a logical shorthand format. For example, intentionally truncating text to a logical shorthand format includes listing January as "Jan", "Jan.", or "J". As another example, shortening text further includes omitting any redundant information that is initially logically evident—such as a year along a calendar axis. As an example, wrapping text includes rewriting text such that some portion of the text, which was initially separated by a space, is presented below another portion of the text for the axis.

Axis information altered along the vertical bars can include any sort of axis label information that logically increases or decreases according to a law of nature (e.g., numerical progressions and time flow). Accordingly, axis information includes time and date information. Axis information also includes increasing or decreasing numbers. The labels are, in an example embodiment, text. Although the foregoing embodiments are described with reference to vertical bars, the axis information can further be altered for horizontal bars. The charts for which axis information is altered can include any of the above described charts.

In order to implement responsive display of horizontal bars functionality according to the above-described method, it is first determined whether or not a chart is implemented in an application on the display device. If a chart is implemented in the application on the display device, then: the size of the chart is determined; and the content of the chart is adjusted to the determined chart size.

In some embodiments, the chart size could be coextensive with a 19 inch monitor, for example: 30 cm by 38 cm (e.g., height versus width, having a 4:5 ratio). Instead, the chart size could be coextensive with a 3.5 inch device, for example: 6 cm by 7 cm (e.g., height versus width, having a 4:5 ratio). The chart size, however, could be any size that is equal to or less than the size of the display screen. The chart size is set by the application developer. After the chart size is determined, the features of the chart, including the text associated with the axis, are adapted to fit to the chart size on the display device. In an example embodiment, the not adapting the layout of the chart would result in illegible text along the axis, and therefore, the text associated with the axis is altered for a better display to the user. In an example embodiment, illegible text associated with a time axis is accordingly altered such that March 2013 is reduced to "Mar" and 2013 is added only adjacent to or below January.

FIG. 8, including FIGS. 8A, 8B, 8C, 8D, 8E, and 8F, illustrates embodiments of a feature 800, responsive display of time axis, for automatically adapting a chart to a display device by changing the layout responsiveness of the display device.

FIG. 8A is an illustration of a feature 800, responsive display of time axis, for automatically adapting layout to the size of the chart. In FIG. 8A, element 802 displays a chart having a large chart size. Element 802 displays the chart having a time axis along the bottom x coordinate, which includes various time labels such as "Jan. 1, 2013" (804), "Jan 3" (806), and "Jan 5" (808). Although the chart size is large, the amount of data provided limits how much information can be displayed beneath the respective bars. Accordingly, information such as the year is displayed only once, in 804, as opposed to repeating in elements 806 and 808. Furthermore, January is shortened to "Jan", which is the logical truncation of January for a user.

FIG. 8B is an illustration of a feature 800, having another embodiment of the responsive display of time axis feature, for automatically adapting layout to the size of the chart. Element 810 displays the same chart having a time axis along the bottom x coordinate, but smaller (medium) than element 802 chart size. The various time labels on 810 include "1 2013 Jan" (812), "3" (814), and "5" (816). Information which can repeated only once, such as the year and the month, is introduced only in 812. The other elements 814 and 816 refer to only the day.

FIG. 8C is an illustration of a feature 800, having another embodiment of the responsive display of time axis feature, for automatically adapting layout to the size of the chart. Element 818 displays the same chart having a time axis along the bottom x coordinate, but on a smaller (small) than element 810 chart size. The various time labels on 818 include "1 2013 Jan" (820), " " (822), and "5" (824). Information which can be repeated only once, such as the year and the month, is introduced only in 820. As the number of days logically increases with each bar, the label for 822 is omitted or hidden. Only every 5 labels (e.g., 824) is provided between the beginning x-axis element and the final x-axis element.

FIG. 8D is an illustration of a feature 800, having another embodiment of the responsive display of time axis feature, for automatically adapting layout to the size of the chart. In FIG. 8D, element 826 displays a chart having a large chart size. Element 826 displays the chart having a time axis along the bottom x coordinate, which includes various time labels such as "Jan 2013" (828), "Jul" (830), and "Dec 2014" (832). Although the chart size is large, the amount of data provided limits how much information can be displayed beneath the respective bars. Accordingly, information such as the year is displayed only upon transitioning years (e.g., 828 and 832). Furthermore, months are shorted to logical truncation versions (e.g., "Jan" for January and "Jul" for July).

FIG. 8E is an illustration of a feature 800, having another embodiment of the responsive display of time axis feature, for automatically adapting layout to the size of the chart. Element 834 displays the same chart having a time axis along the bottom x coordinate, but smaller (medium) than element 826 chart size. The various time labels on 734 include "Jan 2013" (836), "Jul" (838), and "Jan 2014" (840). Notably, the bars between these elements are unlabeled. This is because the logical progression of months in between the labeled elements can be assumed.

FIG. 8F is an illustration of a feature 800, having another embodiment of the responsive display of time axis feature, for automatically adapting layout to the size of the chart. Element 842 displays the same chart having a time axis along the bottom x coordinate, but on a smaller (small) than element 834 chart size. The various time labels on 842 include "Jan 2013" (844), " " (846), and "Jan 2014" (848). In this circumstance, label 846, which should be July 2013, is omitted, or hidden, because its label can logically be inferred from the surrounding elements 844 and 848.

Responsive Format

Once the size of the chart is determined, the layout is adapted to the determined size of the chart. The size of the chart can vary, and the size of the chart is independent from the size of the display device. For example, a chart can be of the same size on a small display screen and on a large display screen. Small charts can be displayed on small display devices, such as smart phones, and small charts can further be displayed on large display devices, such as a desktop computer, as part of a dashboard. The determined chart size is used to set the layout of the chart. The features of the chart, or the content of the chart, adapts to the determined chart size.

Charts include data labels associated with the value displayed. On a chart having vertical bars, for instance, a data label indicating the value of the bar is displayed. Whenever possible, it is advantageous that the value of the bar displayed is as accurate as possible, and therefor displays a fully accurate number with the largest possible number of digits. For example, a data label that is fully accurate might read "345,678,920.08." If a chart is a small chart size, then it is unlikely that the width of the bars is wide enough to avoid overlap between the labels indicating the value of the bar. In such a circumstance, a longer label such as "345,678,920.08" can no longer be fully displayed above the vertical bar.

In order to properly display features of the chart on a chart having a small chart size, the content of the chart is adapted as a default to the small chart size. In order to maintain legible font and graphic sizes, the value of the data displayed is altered as compared to the large chart size equivalent. For a small chart size, instead of presenting a fully accurate number of digits, the data is one of rounded or approximated. In an example embodiment, rounding or estimated is notated as such, so that the user of the small display device understands that the data is rounded or approximated. Notation of the changed data is made available by one of: a metric prefix (e.g., mega (M), kilo (K)) and an asterisk or equivalent causing the user to seek a more detailed explanation elsewhere on the chart. For example, an asterisk could correspond to another asterisk and detailed explanation provided in the chart legend. In some embodiments, the application developer can accept the default behavior or instead force the full data labels to display.

Responsive format can be applied to charts including bar charts. However, the responsive format can further be applied to any sort of chart having a data label that may need truncation, hiding, or adjustment. For example, in a pie chart, a small pie slice might include a label adjusted or hidden in accordance with the responsive format. The labels are, in an example embodiment, numerical values associated with the chart elements.

In order to implement responsive format functionality according to the above-described method, it is first determined whether or not a chart is implemented in an application on the display device. If a chart is implemented in the application on the display device, then: the size of the chart is determined; and the content of the chart is adjusted to the determined chart size.

In some embodiments, the chart size could be coextensive with a 19 inch monitor, for example: 30 cm by 38 cm (e.g., height versus width, having a 4:5 ratio). Instead, the chart size could be coextensive with a 3.5 inch device, for example: 6 cm by 7 cm (e.g., height versus width, having a 4:5 ratio). The chart size, however, could be any size that is equal to or less than the size of the display screen. The chart size is set by the application developer. After the chart size is determined, the features of the chart, including the numerical text associated with the chart features, are adapted to fit to the determined chart size on the display device. In an example embodiment, not adapting the layout of the chart would result in illegible or overlapping text, and therefore, the text associated with the data labels is altered. If the chart can still display the original data label, then the original label will be displayed. If the chart cannot display the original data label, the chart will attempt to shorten the format of the data label. For example, the data labels are reduced to their corresponding metric prefix value and annotated as such with a metric modifier (e.g., M for mega). If the shortened format would still result in illegible or overlapping text, then the data label is hidden.

FIG. 9, including FIGS. 9A, 9B, and 9C, is an illustration of a feature 900, responsive format, for automatically adapting a chart to a display device by changing the layout responsiveness of the display device.

FIG. 9A is an illustration of a feature 900, responsive format, for automatically adapting layout to the size of the chart. Element 902 displays a chart having a large chart size, element 908 displays a chart having a medium chart size, and element 914 displays a chart having a small chart size. In an example embodiment, data associated with a chart element (e.g., a column in a bar chart) could be 23,345 (bar 904) as shown on 902. In element 902, the bar 906 has a data label "18,750".

FIG. 9B is an illustration of a feature 900, having another embodiment of the responsive format feature, for automatically adapting layout to the size of the chart. However, when the same chart is provided on a medium chart size, as shown in 908, the data labels are reduced. Specifically, bar 910 has a data label "23K" and bar 912 has a data label "18K." By switching the data labels to include a short-hand numerical label, or a numerical approximation, several characters of text are reduced. The slimmer bars of element 908 require that, for data labels to be presented clearly, the data label be reduced in length.

FIG. 9C is an illustration of a feature 900, having another embodiment of the responsive format feature, for automatically adapting layout to the size of the chart. Element 914 displays a chart having a small chart size. The slimmer bars of 914 require that the data labels are removed entirely, which avoids user confusion from viewing extremely small or illegible data labels that would be otherwise presented.

Responsive Legend

Once the size of the chart is determined, the layout is adapted to the determined size of the chart. The size of the chart can vary, and the size of the chart is independent from the size of the display device. For example, a chart can be of the same size on a small display screen and on a large display screen. Small charts can be displayed on small display devices, such as smart phones, and small charts can further be displayed on large display devices, such as a desktop computer, as part of a dashboard. The determined chart size is used to set the layout of the chart. The features of the chart, or the content of the chart, adapts to the determined chart size.

Charts frequently include additional information regarding the content of the chart in a legend, or a key for a chart. A legend can include detailed information regarding the chart that is not easily depicted on the chart itself. Information shown in a legend can be encoded in one of: the color of a chart feature, the shape of a chart feature, the pattern of a chart feature, the placement of a chart feature, the name of a chart feature, and so on. For charts having a large chart size, a legend is included in a location selected by the chart developer. According to an example embodiment, the legend is displayed adjacent to the chart. According to another example embodiment, the legend is displayed below the chart. If a chart is a small chart size, then it is unlikely that all features of the chart, such as the legend, can be fully displayed in their original position.

In order to properly display features of the chart on a chart having a small chart size, the content of the chart is adapted to the small chart size. In order to maintain legible font and graphic sizes, as well as to maintain a logical flow of the chart, a location of the legend is altered as compared to the large chart size equivalent. For a small chart size, instead of placing the legend associated with the chart next to the chart, the legend is relocated. In an example embodiment, the legend is relocated to sit below the chart.

In order to implement responsive legend functionality according to the above-described method, it is first determined whether or not a chart is implemented in an application on the display device. If a chart is implemented in the application on the display device, then: the size of the chart is determined; and the content of the chart is adjusted to the determined chart size.

In some embodiments, the chart size could be coextensive with a 19 inch monitor, for example: 30 cm by 38 cm (e.g., height versus width, having a 4:5 ratio). Instead, the chart size could be coextensive with a 3.5 inch device, for example: 6 cm by 7 cm (e.g., height versus width, having a 4:5 ratio). The chart size, however, could be any size that is equal to or less than the size of the display screen. The chart size is set by the application developer. After the chart size is determined, the features of the chart, including the legend, are adapted to fit to the determined chart size on the display device. In an example embodiment, not adapting the legend would result in illegible text and a comparatively small chart due to the placement of the legend next to (e.g., right of the chart or left of the chart), and therefore, the legend is relocated to a different section of the chart for a better display to the user. For example, a legend that would be placed by an application developer to the right of the chart is instead relocated to below the chart.

FIG. 10, including FIGS. 10A and 10B, illustrates embodiments of feature 1000, responsive legend, for automatically adapting a chart to a display device by changing the layout responsiveness of the display device.

FIG. 10A is an illustration of a feature 1000, responsive legend, for automatically adapting layout to the size of the chart. Elements 1002 and 1004 display charts having a large chart size. As shown in element 1002, a legend 1010, which includes multiple legend items, is placed to the right of the chart by the application developer. As shown in element 1004, a legend 1012, which includes multiple legend items, is placed below the chart by the application developer.

FIG. 10B is an illustration of a feature 1000, having another embodiment of the responsive legend feature, for automatically adapting layout to the size of the chart. Elements 1006 and 1008 display charts having a small chart size. Element 1006 depicts, on a small screen device, a legend 1014 at the bottom of the chart. Legend 1014 is a legend that was relocated from a legend initially placed to the right (or the left) of a chart by the application developer on a large chart size, such as the legend 1010 shown in element 1002. Element 1008 depicts, on a small chart size, a legend 1016 at the bottom of the chart. Legend 1016 is a legend that was initially placed to the right (or the left) of a chart by the application developer on a large chart size, such as the legend 1012 shown in element 1004. Each of legends 1008 and 1014 is further, in an example embodiment, resized to a width consistent with a small chart size.

Responsive Toolbar

Once the size of the chart is determined, the layout is adapted to the determined size of the chart. The size of the chart can vary, and the size of the chart is independent from the size of the display device. For example, a chart can be of the same size on a small display screen and on a large display screen. Small charts can be displayed on small display devices, such as smart phones, and small charts can further be displayed on large display devices, such as a desktop computer, as part of a dashboard. The determined chart size is used to set the layout of the chart. The features of the chart, or the content of the chart, adapts to the determined chart size.

Charts frequently include a toolbar which provide additional analysis and evaluation tools related to the content of the chart. A toolbar can include options regarding how to view the chart and other icons. Other icons can include: zoom in and zoom out icons, chart modification options (i.e., switch to pie chart), and links to source data. For charts having a large chart size, a toolbar can be presented in its full form. However, if a chart is a small chart size, then it is unlikely that all of the features of the toolbar, such as all of the icons, can be fully displayed in their original position.

In order to properly display features of the chart on a chart having a small chart size, the content of the chart is adapted to the small chart size. In order to maintain legible font and graphic sizes, as well as to maintain all of the functionality of the toolbar, a display of the toolbar is altered as compared to the large chart size equivalent. For a small chart size, the toolbar can be adjusted to include less text, graphics, or icons. In an example embodiment, the chart icons are removed from the chart, but an option is presented on the toolbar to expand the list of chart icons upon selection.

In order to implement responsive toolbar functionality according to the above-described method, it is first determined whether or not a chart is implemented in an application on the display device. If a chart is implemented in the application on the display device, then: the size of the chart is determined; and the content of the toolbar is adjusted to the determined chart size.

In some embodiments, the chart size could be coextensive with a 19 inch monitor, for example: 30 cm by 38 cm (e.g., height versus width, having a 4:5 ratio). Instead, the chart size could be coextensive with a 3.5 inch device, for example: 6 cm by 7 cm (e.g., height versus width, having a 4:5 ratio). The chart size, however, could be any size that is equal to or less than the size of the display screen. The chart size is set by the application developer. After the chart size is determined, the features of the chart, including the toolbar, are adapted to fit to the determined chart size on the display device. In an example embodiment, not adapting the legend would result in tiny toolbar icons or overlapping text, and therefore, the toolbar is reduced to minimal features on immediate display for a better presentation to the user.

FIG. 11, including FIGS. 11A and 11B, illustrates embodiments of a feature 1100, responsive toolbar, for automatically adapting a chart to a display device by changing the layout responsiveness of the display device.

FIG. 11A is an illustration of a feature 1100, responsive toolbar, for automatically adapting layout to the size of the chart. Element 1102 displays a chart of a large chart size having a chart 1106 with corresponding toolbar 1104. Toolbar 1104 includes several options to modify or analyze the chart 1106.

FIG. 11B is an illustration of a feature 1100, having another embodiment of the responsive toolbar feature, for automatically adapting layout to the size of the chart. Element 1108 displays a chart of small chart size having a chart 1112 with corresponding toolbar 1110. Toolbar 1110 includes significantly fewer options in the immediate screen, as compared to toolbar 1104. However, upon selection of the icon " . . . ", the options from the toolbar can be expanded for user review and selection. The display of chart 1112, however, is not affected and is preserved by minimizing the amount of information presented in toolbar 1110.

Thumbnail Mode

Once the screen size is determined, the interaction is adapted to the determined size of the screen. The screen size can vary, depending upon the type of device used. For example the screen size could be a 19 inch desktop monitor, for example: 30 cm by 38 cm (e.g., height versus width, having a 4:5 ratio). Instead, the screen size could be for mobile device having a 3.5 inch screen, for example: 6 cm by 7 cm (e.g., height versus width, having a 4:5 ratio). The determined screen size is used to set the interaction of the chart. The interactivity of the chart adapts to the determined screen size.

Charts can be displayed in a thumbnail format. A thumbnail presentation is a miniature version of a chart. Generally thumbnails are not interactive, or at least, they are not fully interactive. A thumbnail generally is a placeholder to provide a visual representation for the full, larger-sized, chart, which can be selected by clicking on the thumbnail. Upon a user manipulation of an apparatus, such as selecting the thumbnail with one of a body part or a stylus, the thumbnail expands into a larger, interactive chart. According to an example embodiment, upon selection of the thumbnail, the chart expands to the full screen. In another example embodiment, the chart expands to fill a portion of the full screen. If a screen is a large screen size, then the application developer can select to display a chart in either its full size or in a thumbnail size. If a screen is a small screen size, then it is unlikely that a chart should be displayed in its full size, as this would obscure other application features.

In order to properly provide the interaction needed for small screen display devices, the interaction of the chart is adapted to the small screen size. In order to provide a better user experience, as well as to avoid obscuring other application features, the chart is automatically presented in a thumbnail mode for small screen devices. For large screen display devices, the application developer can still select whether or not the chart will be presented in one of a full mode or a thumbnail mode.

A thumbnail is a size-reduced version of the original, which is often used to index the larger original. A thumbnail is often included on a website or in an application on a dashboard or on an object page. In the thumbnail, the chart is generally not interactive. However, upon a user manipulation of an apparatus, such as clicking on the thumbnail with an optical mouse, the thumbnail expands into a larger, interactive chart.

In order to implement thumbnail mode according to the above-described method, it is first determined whether or not a chart is implemented in an application on the display device. If a chart is implemented in the application on the display device, then: the size of screen size of the display device is detected; and the interaction of the chart is automatically adapted to the determined screen size of the display device.

If, according to the example embodiment, the screen size is determined to be a small screen, for example of a smartphone, then the charts are automatically set to a thumbnail mode. The screen size is determined by the browser and provided as data in the application. For example, the browser has access to HTML code that indicates the screen size of the display device. Typically, the HTML code indicates the size of the display screen in a number of pixels. As an example, less than 700 pixels is considered to be a "small screen", between 700 and 1000 pixels is considered to be a "medium screen", and greater than 1000 pixels is considered to be a "large screen." It should be understood that classifications of pixels into small, medium, and large, is arbitrary and is to be set according to a chart developer or application developer choice.

FIG. 12, including FIGS. 12A and 12B, illustrates embodiments of a feature 1200, thumbnail mode, for automatically adapting an interaction of a chart to a screen size of a display device.

FIG. 12A is an illustration of a feature 1200, thumbnail mode, for automatically adapting interaction to the screen size of the display device. Element 1202 displays an application having multiple charts large display screen. Element 1204 is a thumbnail of a chart, which can be selected upon a click from cursor 1206. When the user clicks by manipulating the cursor 1206, the thumbnail chart 1204 is converted to a full screen interactive chart 1208.

FIG. 12B is an illustration of a feature 1200, having another embodiment of the thumbnail mode feature, for automatically adapting interaction to the screen size of the display device. Similar to 1202, element 1210 displays an application having a chart 1212, which can be selected upon a tap from user apparatus 1214. When the user taps by manipulating the apparatus 1214, the thumbnail chart 1212 is converted to a full screen interactive chart 1216. Therefore, when a user selects a chart that is in a thumbnail mode, the user selection switches the chart from being a non-interactive chart (1204 and 1212) to an interactive chart (1208 and 1216). Upon first implementation and display of the charts, however, the chart is by default set to be in a thumbnail mode, 1212, in an application on a small screen device as is shown in 1210. On a larger screen device, a thumbnail is implemented when the application developer decides to implement a thumbnail—not as a default.

Selection Bar and Selecting Single and Multiple Actions

Once the screen size is determined, the interaction is adapted to the determined size of the screen. The screen size can vary, depending upon the type of device used. For example the screen size could be a 19 inch desktop monitor, for example: 30 cm by 38 cm (e.g., height versus width, having a 4:5 ratio). Instead, the screen size could be for mobile device having a 3.5 inch screen, for example: 6 cm by 7 cm (e.g., height versus width, having a 4:5 ratio). The determined screen size is used to set the interaction of the chart. The interactivity of the chart adapts to the determined screen size.

Commonly, charts include additional options related to interactivity with the chart presentation. For instance, a user generally can select a chart feature and select an additional option for viewing, taking an action on, or sending the chart feature. By manipulating a cursor, for example by using an optical mouse, the user can hold the cursor over a chart feature or click the chart feature when the cursor is placed over the chart feature. A chart feature can be any portion of the chart, but can include: data points, axes, and text associated with the chart. In an example embodiment, for large screen sizes, when the cursor is held over a chart feature, the chart provides in a pop out box a single additional option regarding the chart feature. In another example embodiment, for large screen sizes, when the cursor is held over the chart feature, the chart provides in a pop out box multiple additional options regarding the chart feature. However, if the screen is a small screen size, hover over options are generally unavailable.

In order to properly provide the interaction needed for small screen display devices, the interaction of the chart is adapted to the small screen size. A cursor is not provided on many small screen devices, and accordingly, it is understood that the user interacts with the screen in a different manner. The user manipulates the user interface of the chart with one of a body part or a stylus. The chart viewing controls are therefore implemented such that a single touch gesture, such as a tap, results in the chart providing in a pop out box additional options regarding the chart feature. By implementing a tap over the chart feature of interest, the chart selects the chart feature. After the chart feature is selected, the chart provides, in an example embodiment, in a selection bar a single option related to the selected feature. In another example embodiment, after the chart feature is selected, the chart provides, in the selection bar, a symbol or graphic that indicates multiple additional options are available for the selected chart feature.

Once the user selects, using the available chart feature selection options a chart feature, the chart feature or features are further eligible for a single additional action. As an example, the additional action is a macro related to analysis of the selected feature. As another example, the additional action is a macro related to exporting the selected feature to another application or saving the chart. As an example embodiment, once the user selects, using the available chart feature selection options a chart feature, the chart feature or features are further eligible for multiple additional actions. The toolbar for the chart can provide an option through an interactive area (e.g., a button) on the screen for a single action to be implemented. The toolbar for the chart further provides an option through an interactive area (e.g., a button or a pop out screen) on the screen for multiple actions to be implemented.

Upon a tap, by manipulation of a body part or a stylus, a user selects the symbol or graphic and thereby sees a full list of actions that can be implemented for the selected chart feature. In an example embodiment, the chart provides an acknowledgment that a particular feature is selected or an acknowledgment of how many chart features are selected in the selection bar. According to an example embodiment, the selection bar is displayed at the top of the screen, regardless of whether or not the screen is in portrait or landscape mode. In another example embodiment, the selection bar is displayed at the bottom the screen. According to an example embodiment, the selection bar can be customized by the Application Developer.

In order to implement the selection bar and selection of actions according to the above-described method, it is first determined whether or not a chart is implemented in an application on the display device. If a chart is implemented in the application on the display device, then: the size of screen size of the display device is detected; and the interaction of the chart is automatically adapted to the determined screen size of the display device.

If, according to the example embodiment, the screen size is determined to be a small screen, for example of a smartphone, then the charts are automatically set to the above-described action on selection and selection bar interactivity. The screen size is determined by the browser and provided as data in the application. For example, the browser has access to HTML code that indicates the screen size of the display device. Typically, the HTML code indicates the size of the display screen in a number of pixels. As an example, less than 700 pixels is considered to be a "small screen", between 700 and 1000 pixels is considered to be a "medium screen", and greater than 1000 pixels is considered to be a "large screen." It should be understood that classifications of pixels into small, medium, and large, is arbitrary and is to be set according to a chart developer or application developer choice.

FIG. 13, including FIGS. 13A, 13B, and 13C, illustrates embodiments of a feature 1300, actions on selection, for automatically adapting a chart to a display device by changing the interaction of the chart based on the screen size of the display device.

FIG. 13A is an illustration of a feature 1300, actions on selection, for automatically adapting interaction to the screen size of the display device. Element 1302 displays a chart on a large display screen device. On large screen display devices, such as tablets and desktops, a user clicks or taps on the data point. After clicking on the data point, a dialog box opens. On small screen devices, the dialog box is not displayed. Instead, the selection bar is provided. In a first example embodiment, on a large screen device such as 1302, in order to view additional actions related to the chart, such as save or send, an interactive area of the screen is provided in area 1304. A user can select a feature of the chart by manipulating and clicking with the use of a cursor 1318. After the click, the method proceeds with a display as presented according to 1320. A popover box 1322 confirms the selection of, for example, June 2013. Then, the user can execute an action item for the selected chart feature. As shown, 1304 includes all action icons and buttons that are available to a user for the chart once the user has selected the chart feature. Upon a user's selection of this particular interactive area, the user is provided with options for multiple actions, including at least one single action, that can be performed for the chart.

FIG. 13B is an illustration of a feature 1300, having another embodiment of the actions on selection feature, for automatically adapting interaction to the screen size of the display device. In a second example embodiment, on a small screen device such as 1314, a user performs a gesture, by manipulating one of a stylus and a body part, 1316 to select a feature of the chart, here a blue column associated with June of 2013 and having a data value of 71,821. If the chart provides a single action that can be taken on the chart, the method proceeds with a display as presented according to 1306. If the chart provides multiple actions that can be taken on the chart, the method proceeds with a display as presented according to 1308. In 1306, a single action, "Drill Down" 1310, is provided in a Selection Bar, which is part of the toolbar. In 1808, multiple actions are indicated as being available to the user in the Selection Bar, which is part of the toolbar, as noted by the symbol 1312. 1312 indicates that, upon selection by a tap or another gesture, a pop out box will be provided.

FIG. 13C is an illustration of a feature 1300, having another embodiment of the actions on selection feature, for automatically adapting interaction to the screen size of the display device. Such a pop out box is shown in FIG. 13C as 1316. 1316 provides a total list of actions that can be taken. As shown in both 1306 and 1308, the Selection Bars indicate that only one selection, "Selection (1)" is available for action in each case.

Responsive Zoom Slider

Once the screen size is determined, the interaction is adapted to the determined size of the screen. The screen size can vary, depending upon the type of device used. For example the screen size could be a 19 inch desktop monitor, for example: 30 cm by 38 cm (e.g., height versus width, having a 4:5 ratio). Instead, the screen size could be for mobile device having a 3.5 inch screen, for example: 6 cm by 7 cm (e.g., height versus width, having a 4:5 ratio). The determined screen size is used to set the interaction of the chart. The interactivity of the chart adapts to the determined screen size.

Charts can be displayed in a manner such that the field of view is controlled by a user. For example, a zoom slider, which includes a miniaturized plot of the entire chart can be used to control the field of view of the user. Therefore, even if the full extent of the chart is not visible at one time, the user can manipulate an apparatus, such as an optical mouse, to change the visible portion of the chart on the screen. In order to change the visible position of the chart on the screen, the user can use the miniaturized plot of the entire chart for which a small portion of the entire chart is highlighted or boxed off. By manipulating the zoom slider, which delimits portions of the miniaturized plot, a user can see different portions of the chart. By manipulating the left border of the zoom slider and/or the right border of the zoom slider, the user can expand the viewable portion of the chart. Manipulations of the borders of the zoom slider change the range of the chart on display. Extending the borders of the zoom slider has the same effect as performing a zoom out control, and contracting the borders of the zoom slider has the same effect as performing a zoom in control. According to an example embodiment on a large screen size, the zoom slider is located along the bottom of the visible portion of the chart. According to another example embodiment on a large screen size, the zoom slider is located along the top of the visible portion of the chart. In another example embodiment on a large screen size, the zoom slider is presented vertically along either side of the visible portion of the chart. By manipulating the apparatus to point and click at different points of the miniaturized plot of the entire chart, the visible portion of the chart changes to match the zoom slider selected portion. In another example embodiment, the user can manipulate the apparatus to point, click, and drag the highlighted or boxed small portion of the miniaturized plot of the entire chart, which results in the visible portion of the chart changing to match the zoom slider selected portion. However, if a screen is a small screen size, it is unlikely that there is sufficient space to display the miniaturized plot of the entire chart, as this would be either unreadable or take too large of a portion of the screen.

In order to properly provide the interaction needed for small screen display devices, the interaction of the chart is adapted to the small screen size. In order to provide a better user experience, as well as to avoid obscuring other application features, the chart is automatically presented without the miniaturized plot of the entire chart for the small screen devices. On the small display screen devices, the chart is presented in zoomed segments without displaying the full extent of the chart at one time. However, on the small screen, in order to reserve display space for the chart itself, the zoom slider is hidden. In order to preserve the functionality of the zoom slider, the small screen instead allows for user control to be implemented by manipulation of one of a body part and a stylus on the screen of the small device.

In order to implement zoom slider functionality according to the above-described method, it is first determined whether or not a chart is implemented in an application on the display device. If a chart is implemented in the application on the display device, then: the size of screen size of the display device is detected; and the interaction of the chart is automatically adapted to the determined screen size of the display device.

If, according to the example embodiment, the screen size is determined to be a small screen, for example of a smartphone, then the charts are automatically set to dispose of the zoom slider. The screen size is determined by the browser and provided as data in the application. For example, the browser has access to HTML code that indicates the screen size of the display device. Typically, the HTML code indicates the size of the display screen in a number of pixels. As an example, less than 700 pixels is considered to be a "small screen", between 700 and 1000 pixels is considered to be a "medium screen", and greater than 1000 pixels is considered to be a "large screen." It should be understood that classifications of pixels into small, medium, and large, is arbitrary and is to be set according to a chart developer or application developer choice.

FIG. 14, including FIGS. 14A and 14B, illustrates embodiments of a feature 1400, zoom slider, for automatically adapting an interaction of a chart to a screen size of the display device.

FIG. 14A is an illustration of a feature 1400, zoom slider, for automatically adapting interaction to the screen size of the display device. Element 1404 displays a chart on a large display screen. The user, by manipulation of a zoom slider 1406, can see various segments that are included as part of the total graph. One viewing segment 1408 of the total graph is shown in the display, which corresponds to the area of the total graph selected by the zoom slider. The user, by manipulation of a mouse, can point and click at different points along the slider axis, or point, drag, and release the zoom slider in order to change the viewable area 1408.

FIG. 14B is an illustration of a feature 1400, having another embodiment of the zoom slider feature, for automatically adapting interaction to the screen size of the display device. In a smaller screen, as shown on the smartphone, a chart 1402 is interactive but does not display the zoom slider or the zoom axis to the user for manipulation. Instead, to preserve screen display space, the user can perform a gesture to manipulate the viewable area of the chart. Specifically, the user can swipe left and swipe right to move the screen focus to the right and to the left. The user can further extend and contract the borders of the viewable chart area using a pinch gesture and a spread gesture.

Zoom

Once the screen type is determined, the interaction is adapted to the determined screen type. The screen type can vary, depending upon the type of device used. For example, if the device is one of a tablet or a smartphone, the screen type is generally a touchscreen. If the device is a desktop, then the screen type is generally not a touchscreen and interaction is instead performed through linked devices such as: mechanical computer, mice, optical computer mice, a keyboard, etc. The determined screen type is used to set the interaction of the chart. The interactivity of the chart adapts to the determined screen type.

Charts can be displayed with the feature to allow for image scaling, or zooming. In the graphical environment presented on the screen, a user can select to change the scale of the viewed area to see more or less detail than is currently available. By manipulating an element, the user can perform the selection. On displays not having touchscreen interactivity, a user can manipulate an apparatus, such as an optical mouse, to interact with the zoom option (i.e., a plus sign to zoom in or a minus sign to zoom out). By clicking the feature presented on the screen, or by using a selection of the Ctrl+ mouse wheel, the user manipulates an appropriate apparatus to change the scale of the viewed area. By interacting with the zoom options, the user can increase or decrease the visible space on the chart. A user can, through manipulation of the mouse, zoom in on the chart. Also through manipulation of the mouse, the user can zoom out from the chart. If the screen type is a touchscreen, however, the aforementioned described interactivity is no longer appropriate.

On a touchscreen device, different manners of interaction are available for users. In an example embodiment, the features are not presented for zoom in (i.e., plus sign) and zoom out (i.e., minus sign). Instead, on touchscreen devices, the user interacts directly with the screen through a series of gestures. By interacting with the screen, it is understood that the user manipulates the user interface with one of a body part or a stylus. The chart viewing controls are therefore implemented such that a multi-touch gesture, such as spreading one's fingers on the touchscreen of the display device and pinching one's fingers on the touchscreen of the display device, results in zooming with respect to the chart. In an example embodiment, spreading fingers is associated with zooming in on the chart and pinching fingers is associated with zooming out of the chart. Other multi-touch gestures capable of zooming, known in the art, are also available for the user's interaction with the chart on the display device.

In order to implement zoom functionality according to the above-described method, it is first determined whether or not a chart is implemented in an application on the display device. If a chart is implemented in the application on the display device, then: the screen type of the display device is determined; and automatically adapt the interaction of the chart to the determined screen type of the display device.

If, according to the example embodiment, a screen type is determined to be a touchscreen device, then the zooming interaction is changed to user gesture manipulation accordingly. For instance, for zooming interaction with a touchscreen device, the chart will be responsive to multi-touch gestures such as: touch and spread (e.g., to zoom in on the chart) and touch and pinch (e.g., to zoom out of the chart). The screen type is determined by the browser and provided as data in the application. For example, the browser has access to HTML code that indicates the screen type of the display device.

Figure 15A:
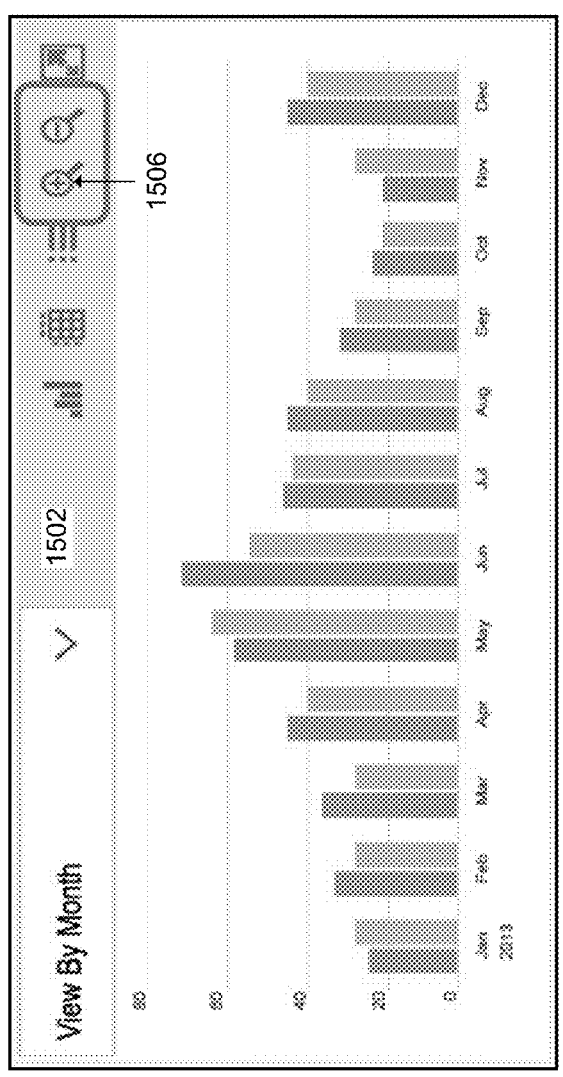
FIG. 15A is an illustration of feature 1500, zoom out for automatically adapting interaction to the screen type of the display device.
Figure 15B:
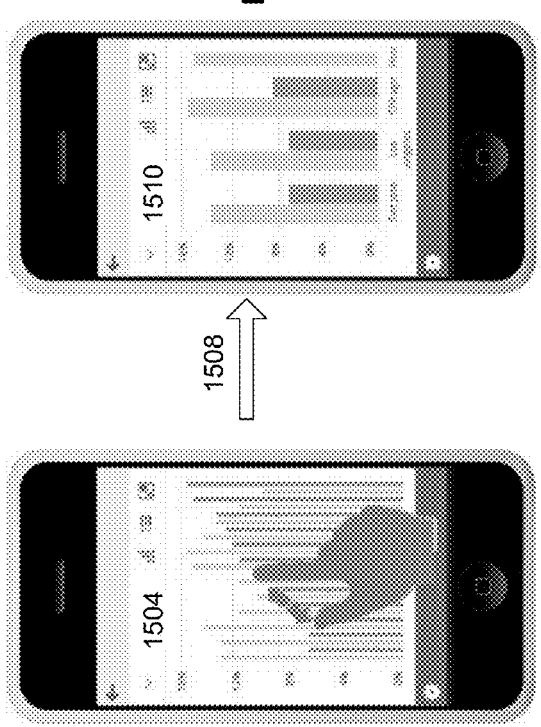
FIG. 15B is an illustration of feature 1500, having another embodiment of the zoom out feature for automatically adapting interaction to the screen type of the display device.

FIGS. 15 and 16, including FIGS. 15A and 15B as well as FIGS. 16A and 16B, illustrate respectively embodiments of a feature 1500, zoom out, and a feature 1600, zoom in, for automatically adapting a chart to a display device by changing the user interaction responsiveness of the display device.

FIG. 15A is an illustration of feature 1500, zoom out for automatically adapting interaction to the screen type of the display device. Element 1502 displays a chart on a non-touchscreen device. To zoom out of the chart on the large display screen, a user clicks, by manipulating a mouse, a symbol 1606 on the toolbar of the chart.

FIG. 15B is an illustration of feature 1500, having another embodiment of the zoom out feature for automatically adapting interaction to the screen type of the display device. Element 1504 displays a chart on a touchscreen device. As shown with regard to element 1508, a user can one of pinch fingers to perform a zooming motion (e.g., zooming in with 1508). The usage of zoom can, in the case of the non-touchscreen device, result in a zoomed in chart as is shown in elements 1502. The usage of zoom can, in the case of the touchscreen device, result in a zoomed out chart as shown in element 1510.

FIG. 16A is an illustration of feature 1600, zoom in, for automatically adapting interaction to the screen type of the display device. Element 1602 displays a chart on a non-touchscreen device. To zoom in on the chart for the large display screen, a user clicks, by manipulating a mouse, a symbol 1506 on the toolbar of the chart.

FIG. 16B is an illustration of feature 1600, having another embodiment of the zoom in feature, for automatically adapting interaction to the screen type of the display device.

Element 1604 displays a chart on a touchscreen device. As shown with regard to element 1608, a user can spread fingers to perform a zooming motion (e.g., zooming out with 1608). The usage of zoom can, in the case of the non-touchscreen device, result in a zoomed in chart as is shown in element 1602. The usage of zoom can, in the case of the touchscreen device, result in a zoomed in chart as shown in element 1610.

Responsive Tooltip

Once the screen type is determined, the interaction is adapted to the determined screen type. The screen type can vary, depending upon the type of device used. For example, if the device is one of a tablet or a smartphone, the screen type is generally a touchscreen. If the device is a desktop, then the screen type is generally not a touchscreen and interaction is instead performed through linked devices such as: mechanical computer, mice, optical computer mice, a keyboard, etc. The determined screen type is used to set the interaction of the chart. The interactivity of the chart adapts to the determined screen type.

Charts can be displayed with features for user interaction that provide additional information to a user regarding the chart upon a user selection of a chart feature. By manipulating an element, the user can perform the selection. On displays not having a touchscreen interactivity, a user can manipulate an apparatus, such as an optical mouse, to hold or hover a cursor over a chart feature or click the chart feature when the cursor is placed over the chart feature. A chart feature can be any portion of the chart, but can include: data points, axes, hyperlinks, and text associated with the chart. When the cursor is held over a chart feature, the chart provides in a pop out box, or a hover box, additional information regarding the chart feature. If the screen type is a touchscreen, however, the aforementioned described interactivity is no longer appropriate.

On a touchscreen device, different manners of interaction are available for users. In an example embodiment, the small screen should provide additional information to a user regarding the chart upon a user selection of a chart feature. A cursor is not provided on many these touchscreen devices, and accordingly, it is understood that the user interacts with the screen in a different manner. The user manipulates the user interface of the chart with one of a body part or a stylus. The chart viewing controls are therefore implemented such that a single touch gesture, such as a press and hold (or a long press) and a tap, results in the chart providing in a pop out box, or hover box, additional information regarding the chart feature. According to an example embodiment, a chart on the small screen instead has a slider bar along an axis of the chart. By implementing a press and hold (or a long press) or a tap over the chart feature of interest, the chart provides in a pop out box additional information regarding the chart feature.

In order to implement responsive tooltip functionality according to the above-described method, it is first determined whether or not a chart is implemented in an application on the display device. If a chart is implemented in the application on the display device, then: the screen type of the display device is determined; and automatically adapt the interaction of the chart to the determined screen type of the display device.

If, according to the example embodiment, a screen type is determined to be a touchscreen device, then the responsive tooltip interaction is changed to user gesture manipulation accordingly. For instance, for interaction with a chart feature on a touchscreen device, the chart will be responsive to multi-touch gestures such as a press and hold. The screen type is determined by the browser and provided as data in the application. For example, the browser has access to HTML code that indicates the screen type of the display device.

Figures 17A, 17B:
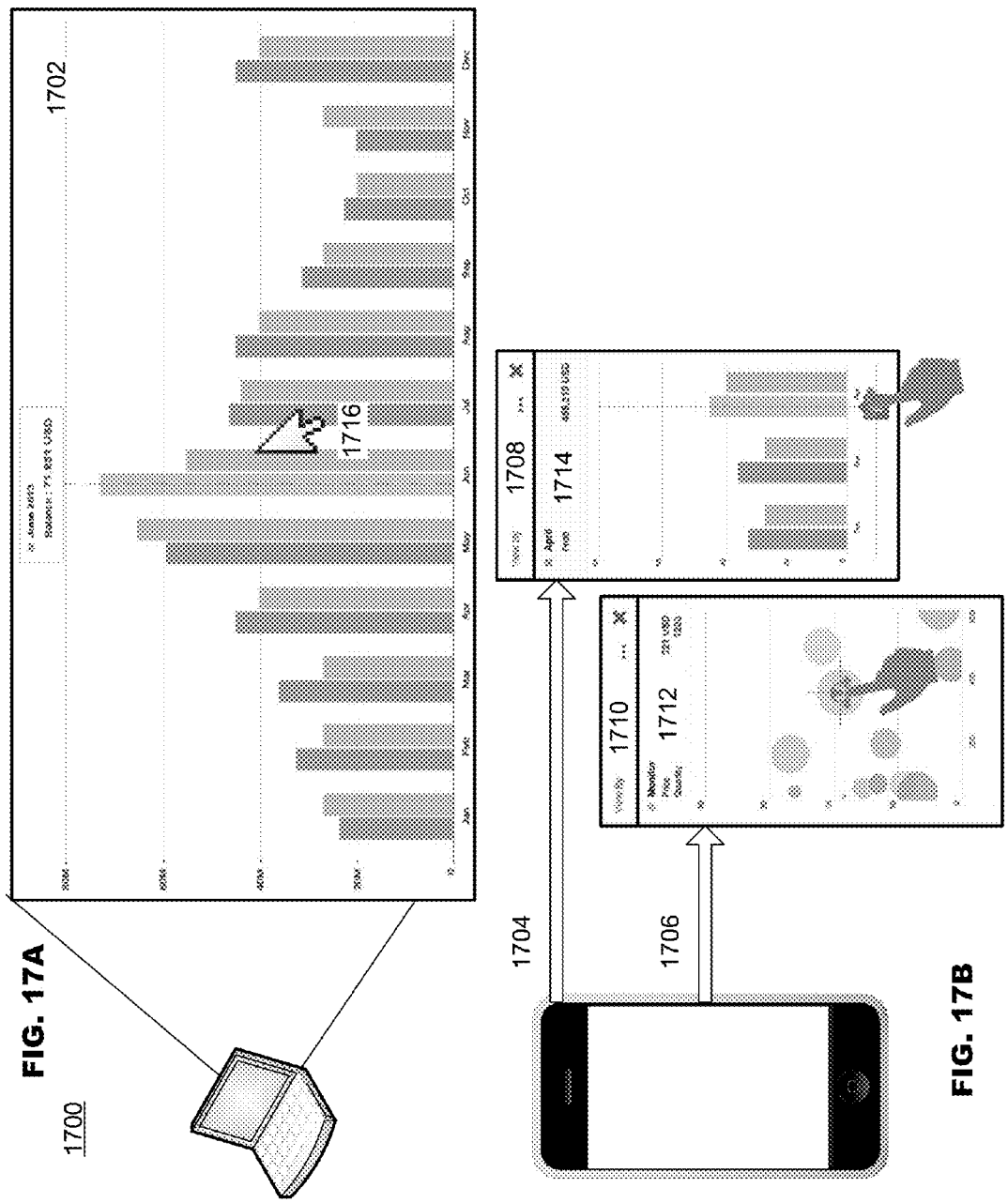
FIG. 17A is an illustration of a feature 1700, responsive tooltip, for automatically adapting interaction to the screen type of the display device.
FIG. 17B is an illustration of a feature 1700, having another embodiment of the responsive tooltip feature, for automatically adapting interaction to the screen type of the display device.

FIG. 17, including FIGS. 17A and 17B, illustrates embodiments of a feature 1700, responsive tooltip, for automatically adapting a chart to a display device by changing the user interaction responsiveness of the display device.

FIG. 17A is an illustration of a feature 1700, responsive tooltip, for automatically adapting interaction to the screen type of the display device. Element 1702 displays a chart on a non-touchscreen device. To interact with the chart, and to receive additional information regarding a specific feature of the chart, such as the blue bar column associated with June, a user manipulates a mouse, such as an optical mouse, to hold a cursor 1716 over the blue bar column associated with June. After a predetermined period of time, the chart displays information associated with the blue bar column associated with June. The information presented by the chart, in a pop over box, identifies that the column represents data from "June 2013" and that the Balance associated with the column is "71,821 USD." The user, by hovering the cursor over the blue bar column, has accordingly performed a selection to receive information regarding the bar without performing any action associated with a toolbar or a click event. On a small screen device, such as a smartphone, a responsive tooltip is implemented in one of at least two ways.

FIG. 17B is an illustration of a feature 1700, having another embodiment of the responsive tooltip feature, for automatically adapting interaction to the screen type of the display device. In a first way, 1704, the display 1708 of the small screen device allows for a user to perform a selection of a chart feature of interest indicated by a line associated with a slider by one of selecting or tapping a portion of on a slider bar along the perimeter of the chart. By performing the gesture over the slider bar, the user has selected blue bar column associated with April. An information bar 1714 is provided at the top of screen based on the user's gesture that provides information. Specifically, the information bar identifies that the selected month was April and that the value associated with the selected month was "458,210 USD." By performing the gesture over the feature of interest, here a bubble on a bubble chart, the user has selected a specific bubble to receive information regarding the bubble without performing any action associated with a toolbar or a click event. In a second way, 1706, the display 1710 of the small screen device allows for a user to perform a selection of a chart feature of interest by implementing a long press, using one of a finger or a stylus, over the chart feature of interest. By performing the gesture over the feature of interest, here a data point on a bubble chart, the user has selected a specific bubble to receive information regarding the bubble without performing any action associated with a toolbar or a click event. An information bar 1712 is provided at the top of the screen based on the user's gesture that provides information. Specifically, the information bar identifies that the selected data point refers to a "Monitor" and is associated with a Price of "321 USD" and a Quantity of "1200."

As previously stated, the foregoing embodiments are examples of the method described above and should not be found to limit the scope of the method. In each of the above described embodiments, changes in responsive layout and interaction response can be implemented on a chart by chart basis within an application. In another example embodiment, changes in responsive layout and interaction response are implemented for all charts, or a subset of chart, within an application. Modifications to the foregoing embodiments are within the scope of the described method. Furthermore, combination of the foregoing embodiments into one chart is within the scope of the described method. In addition, combination of the foregoing embodiments into one application is within the scope of the described method. More than one of the embodiments can be implemented in a single chart or in an application by the Chart Developer as the charts are adapted to user devices.

The foregoing embodiments further use the language "small display device" or "small device" and "large display device" or "large device." These generic classifications are included to provide a generalized classification for comprehension of the method. It should be noted that the size of the device under review, for each particular instance, is a size along a spectrum of device sizes available in the electronics display industry. The method can be consistently operated with any of the devices having a display size, and it will not be necessary to determine in every case whether a device is classified as "small" or "large." A Chart Developer can classify in a library a spectrum of device sizes under any particular descriptive size heading: extra small, small, medium, large, and extra-large, among others. Moreover, device sizes can be classified in either only one of a length or a width directionality, or, in each of a length and a width directionality. In an example embodiment, a Chart Developer generates size classifications to distinguish between the types of device being used. From the size classifications, therefore, the Chart Developer can determine whether the device is a monitor, a smartphone, or tablet and change behavior according to the type of device classification. In another example embodiment, a Chart Developer generates size classifications to determine the type of apparatus that a user would manipulate in order to interact with the display device. From size classifications, therefore, the Chart Developer can determine whether the type of apparatus is a body part such as a finger or multiple fingers, a stylus, an optical mouse, or a track pad.

A gesture, as described in the above embodiments, can refer to at least any of the following, or any of the following. A gesture can be formed by one of the following implements coming into contact in at least one location with a user interface: a hand, a finger, multiple fingers, and an apparatus (such as a stylus). A gesture occurs when one of the implements performs at least one of the following: a flick, a touch/press and hold, utilization of a touch point, a tap, a double tap, a long press, a nudge, a tap-slide, a drag, a touch, a pinch, a spread, a touch and tap, a pan, a zoom in, a zoom out, a rotate, a press and tap, a slide, a drag, a slide to rearrange, a swipe to select, and a scroll. The gestures described herein are not an exhaustive or comprehensive list of gestures capable of being implemented or adapted by the method. Instead, any gestures known in the art to allow for interactivity between a user and the display device should be considered incorporated herein.

A pop out box, as described herein, refers to any sort of display that includes data related to a selected feature of a chart and that is not anchored to a particular portion of the screen. Pop out boxes are known to those of skill in the application design art, and should further be considered commensurate in scope to hover boxes, pop over boxes, and dialog boxes. A pop out box includes informational text related to the selected feature or features of the chart or actions that can be taken with respect to the selected feature or features of the chart.

The above described embodiments of chart adaptations are implemented as part of a library made available to Application Developers. For example, such a library can be a public library such as the SAP UI_FIORI library. The library in which the chart adaptations are made available are control libraries, and they are made available to web Application Developers. Therefore, the library is included in an Application Development file, such as an HTML file, to be executed in a web browser. The library can be included in an Application Development file that is run in any type of web browser.

A surface that responds to a gesture, which is herein referred to as a display device, can otherwise be referred to a surface, a monitor, a track pad, a touchscreen, a tablet (such as an iPad and a Microsoft Surface), a smartphone (such as an iPhone and an Android device), a laptop computer, a desktop computer, and another interactive networked product (such as an iPod).

It should be appreciated that the present invention can be implemented in numerous ways, including as a process, an apparatus, a system, a computer processor executing software instructions, or a computer readable medium such as a non-transitory computer readable storage medium, or a computer Network wherein program instructions are sent over optical or electronic communication or non-transitory links. It should be noted that the order of the steps of disclosed processes can be altered within the scope of the invention, as noted in the appended claims and in the description herein.

Although the foregoing invention has been described in some detail for purposes of clarity of understanding, it will be apparent that certain changes and modifications can be practiced within the scope of the appended claims. The present invention can be practiced according to the claims and/or the embodiments without some or all of these specific details. Portions of the embodiments described herein can be used with or without each other and can be practiced in conjunction with a subset of all of the described embodiments. For the purpose of clarity, technical material that is known in the technical fields related to the invention has not been described in detail so that the present invention is not unnecessarily obscured.

It should be noted that there are many alternative ways of implementing both the process and apparatus of the present invention. Accordingly, the present embodiments are to be considered as illustrative and not restrictive, and the invention is not to be limited to the details given herein, but can be modified within the scope and equivalents of the appended claims.

What is claimed is:

1. A method for automatically adjusting a chart to a display device, the method being implemented by one or more data processors forming part of at least one computing device and comprising:

determining, by at least one data processor, that a chart is implemented in a software application being executed on the display device, and that the chart is implemented in a graphical user interface of the application on the display device;

determining, by at least one data processor, at least one adaptation factor;

performing, by at least one data processor, a media query to obtain information characterizing the at least one adaptation factor; and automatically adapting, by at least one data processor, a visualization and adjusting an interaction of the chart in the graphical user interface based on the at least one adaptation factor, wherein the at least one adaptation factor is one of: a size of the chart, a size of a screen of the display device, a type of the screen of the display device, wherein adjusting the interaction comprises:
determining, by at least one data processor, which of a plurality of interactive gestures can be performed on the chart in the graphical user interface based on the results from the media query; and implementing, by at least one data processor, the determined interactive gestures in the graphical user interface; and wherein adapting the visualization comprises:
relocating, by at least one data processor, a toolbar associated with the chart and reducing the content of the toolbar based on the size of the chart.

2. The method of claim 1, further comprising: if the at least one adaptation factor is the size of the chart: performing the media query comprises querying, by at least one data processor, an application hosting the chart for the chart size.

3. The method of claim 1, further comprising: if the at least one adaptation factor is the size of the screen of the display device: performing, the media query for the size of the screen.

4. The method of claim 1, further comprising: if the at least one adaptation factor is the type of the screen of the display device: performing the media query for the type of the screen.

5. The method of claim 1, responsive to the at least one adaptation factor being the size of the chart, the automatically adapting the chart further comprising: adjusting, by at least one data processor, a layout of the chart to the determined chart size.

6. The method of claim 5, wherein the adjusting the layout includes at least one of:
reducing, by at least one data processor, at least some of the features of the chart;
enlarging at least some of the features of the chart;
hiding, by at least one data processor, at least some of the features of the chart.

7. The method of claim 1, responsive to the at least one adaptation factor being the size of the chart, the adapting the visualization further comprising:
adjusting, by at least one data processor, a layout of the toolbar in relation to the determined chart size.

8. The method of claim 1, responsive to the at least one adaptation factor being the type of the screen of the display device, the automatically adapting the chart further comprising:
adjusting, by at least one data processor, an interaction to the determined type of the screen.

9. The method of claim 8, wherein adjusting the interaction includes at least one of:
recognizing, by at least one data processor, a first interactive gesture for a first screen type and a second interactive gesture for a second screen type, wherein the first interactive gesture and the second interactive gesture perform a same function on the chart.

10. The method of claim 5, wherein adjustment of the layout is performed by at least one of: (i) a responsive display of horizontal bars, (ii) a responsive display of an axis, (iii) a responsive format, (iv) a responsive legend, and (v) a responsive toolbar.

11. The method of claim 1, wherein adjustment of the interaction is performed by at least one of: (i) a thumbnail mode, (ii) an action on selection, and (iii) a responsive zoom slider.

12. The method of claim 8, wherein adjustment of the interaction is performed by at least one of: (i) a zoom out, (ii) a zoom in, and (iii) a responsive tooltip.

13. The method of claim 1, wherein a default setting for the chart is set according to the automatic adaptation.

14. The method of claim 1, wherein the size of the screen is classified as one of small, medium, and large.

15. The method of claim 1, wherein the type of the screen is classified as one of touchscreen and non-touchscreen.

16. A system for automatically adjusting a chart to a display device, the system comprising: at least one server having a database hosting a library, the at least one server: receiving one of: (i) over a network connection and (ii) over a local connection, a request from an application to access the library, and providing, over the network connection and in response to the request, the library for installation;

wherein the library automatically adapts the chart to the display device by:
determining, by at least one data processor, that a chart is implemented in a software application being executed on the display device, and that the chart is implemented in a graphical user interface of the application on the display device:

determining at least one adaptation factor;

performing a media query to obtain information characterizing the at least one adaptation factor; and automatically adapting a visualization and adjusting an interaction of the chart in the graphical user interface based on the at least one adaptation factor, wherein the at least one adaptation factor is one of: a size of the chart, a size of a screen of the display device, a type of the screen of the display device, wherein adjusting the interaction comprises:
determining, by at least one data processor, which of a plurality of interactive gestures can be performed on the chart in the graphical user interface based on the results from the media query; and implementing, by at least one data processor, the determined interactive gestures in the graphical user interface; and wherein adapting the visualization comprises:
relocating, by at least one data processor, a toolbar associated with the chart and reducing the content of the toolbar based on the size of the chart.

17. A non-transitory computer readable storage device storing program instructions that, when executed, cause a processing device to perform a method for automatically adjusting a chart to a display device, the method comprising:
determining, by at least one data processor, that a chart being implemented in a software application being executed on the display device, and that the chart is implemented in a graphical user interface of the application on the display device:

determining at least one adaptation factor;

performing a media query to obtain information characterizing the at least one adaptation factor; and
automatically adapting a visualization and adjusting an interaction of the chart in the graphical user interface based on the at least one adaptation factor,
wherein the at least one adaptation factor is one of: a size of the chart, a size of a screen of the display device, a type of the screen of the display device,
wherein adjusting the interaction comprises:
  determining, by at least one data processor, which of a plurality of interactive gestures can be performed on the chart in the graphical user interface based on the results from the media query; and
  implementing, by at least one data processor, the determined interactive gestures in the graphical user interface; and
wherein adapting the visualization comprises:
  relocating, by at least one data processor, a toolbar associated with the chart and reducing the content of the toolbar based on the size of the chart.

18. The method of claim 1, wherein the display device comprises a touch-screen interface and the gestures all comprise types of interactions with the touch-screen interface.

19. The method of claim 1, wherein the adapting the visualization comprises at least one of changing dimensions, scaling, enlarging, extending, magnifying, spreading, constricting, hiding, lessening, reducing, compressing, shrinking, and adjusting to a ratio.

20. The method of claim 1, wherein the adapting the visualization further comprises reducing, by at least one data processor, an amount of data in the chart through approximation or rounding.

* * * * *